(12) United States Patent
Kawabata et al.

(10) Patent No.: US 11,512,361 B2
(45) Date of Patent: Nov. 29, 2022

(54) ELECTRIC RESISTANCE WELDED STEEL PIPE OR TUBE AND PRODUCTION METHOD FOR ELECTRIC RESISTANCE WELDED STEEL PIPE OR TUBE

(71) Applicants: JFE STEEL CORPORATION, Tokyo (JP); JFE Welded Pipe Manufacturing Co., Ltd., Tokyo (JP)

(72) Inventors: Yoshikazu Kawabata, Tokyo (JP); Makio Gunji, Tokyo (JP)

(73) Assignees: JFE STEEL CORPORATION, Tokyo (JP); JFE Welded Pipe Manufacturing Co., Ltd., Tokyo (JP)

( * ) Notice: Subject to any disclaimer, the term of this patent is extended or adjusted under 35 U.S.C. 154(b) by 278 days.

(21) Appl. No.: 16/958,736

(22) PCT Filed: Dec. 26, 2018

(86) PCT No.: PCT/JP2018/047972
§ 371 (c)(1),
(2) Date: Jun. 29, 2020

(87) PCT Pub. No.: WO2019/131813
PCT Pub. Date: Jul. 4, 2019

(65) Prior Publication Data
US 2020/0332381 A1    Oct. 22, 2020

(30) Foreign Application Priority Data
Dec. 27, 2017    (JP) .............................. JP2017-251999

(51) Int. Cl.
| | |
|---|---|
| *C21D 9/08* | (2006.01) |
| *B23K 11/087* | (2006.01) |
| *B23K 31/12* | (2006.01) |
| *C21D 1/28* | (2006.01) |
| *C21D 6/00* | (2006.01) |
| *C22C 38/00* | (2006.01) |
| *C22C 38/02* | (2006.01) |
| *C22C 38/06* | (2006.01) |
| *C22C 38/08* | (2006.01) |
| *C22C 38/20* | (2006.01) |
| *C22C 38/24* | (2006.01) |
| *C22C 38/28* | (2006.01) |
| *C22C 38/32* | (2006.01) |

(Continued)

(52) U.S. Cl.
CPC ............ *C21D 9/08* (2013.01); *B23K 11/0873* (2013.01); *B23K 31/12* (2013.01); *C21D 1/28* (2013.01); *C21D 6/001* (2013.01); *C21D 6/002* (2013.01); *C21D 6/005* (2013.01); *C21D 6/008* (2013.01); *C22C 38/001* (2013.01); *C22C 38/002* (2013.01); *C22C 38/02* (2013.01); *C22C 38/06* (2013.01); *C22C 38/08* (2013.01); *C22C 38/20* (2013.01); *C22C 38/24* (2013.01); *C22C 38/28* (2013.01); *C22C 38/32* (2013.01); *C22C 38/38* (2013.01); *B23K 2101/06* (2018.08); *B23K 2103/04* (2018.08)

(58) Field of Classification Search
CPC . B23K 11/0073; B23K 11/0873; B23K 11/16; B23K 2101/06; B23K 2101/10; B23K 2103/04; B23K 31/027; B23K 31/12; C21D 1/28; C21D 6/001; C21D 6/002; C21D 6/005; C21D 6/008; C21D 9/08; C21D 9/50; C22C 38/00; C22C 38/001; C22C 38/002; C22C 38/02; C22C 38/06; C22C 38/08; C22C 38/14; C22C 38/20; C22C 38/24; C22C 38/28; C22C 38/32; C22C 38/38; C22C 38/58
See application file for complete search history.

(56) References Cited

U.S. PATENT DOCUMENTS

| 9,862,014 | B2 | 1/2018 | Kawabata et al. |
| 2013/0126036 | A1 | 5/2013 | Aratani et al. |
| 2015/0368768 | A1 | 12/2015 | Aratani et al. |

FOREIGN PATENT DOCUMENTS

| CN | 101622368 A | 1/2010 |
| CN | 101925678 A | 12/2010 |

(Continued)

OTHER PUBLICATIONS

Sep. 25, 2020, the Extended European Search Report issued by the European Patent Office in the corresponding European Patent Application No. 18894950.7.
Mar. 29, 2021, Office Action issued by the China National Intellectual Property Administration in the corresponding Chinese Patent Application No. 201880084274.X with English language search report.

(Continued)

*Primary Examiner* — Jenny R Wu
(74) *Attorney, Agent, or Firm* — Kenja IP Law PC

(57) ABSTRACT

Provided is an electric resistance welded steel pipe or tube having excellent fatigue durability after rapid and short-time heating quenching treatment. An electric resistance welded steel pipe or tube comprises: a base metal being a steel sheet having a specific chemical composition and an electric resistance weld portion having a bond width of $40 \times 10^{-6}$ m or more and $120 \times 10^{-6}$ m or less, wherein $C_0$-$C_1$ is 0.05 mass % or less, where $C_0$-$C_1$ is a difference between $C_1$ in mass % which is a minimum C content of the electric resistance weld portion and $C_0$ in mass % which is a C content of the steel sheet, and a depth of a total decarburized layer in each of an inner surface layer and an outer surface layer of the electric resistance welded steel pipe or tube is $50 \times 10^{-6}$ m or less.

4 Claims, 4 Drawing Sheets

(51) Int. Cl.
     *C22C 38/38*     (2006.01)
     *B23K 103/04*   (2006.01)
     *B23K 101/06*   (2006.01)

(56) References Cited

FOREIGN PATENT DOCUMENTS

| | | |
|---|---|---|
| CN | 102906293 A | 1/2013 |
| CN | 104968821 A | 10/2015 |
| EP | 2239343 A1 | 10/2010 |
| EP | 2578712 A1 | 4/2013 |
| EP | 3476953 A1 | 5/2019 |
| JP | S58123858 A | 7/1983 |
| JP | S6145688 B2 | 10/1986 |
| JP | H0158264 B2 | 12/1989 |
| JP | H0693339 A | 4/1994 |
| JP | H0693339 A * | 4/1994 |
| JP | 2814882 B2 | 10/1998 |
| JP | 2007056283 A | 3/2007 |
| JP | 2008208417 A | 9/2008 |
| JP | 2009197327 A | 9/2009 |
| WO | 2014119802 A1 | 8/2014 |

OTHER PUBLICATIONS

Apr. 2, 2019, International Search Report issued in the International Patent Application No. PCT/JP2018/047972.

* cited by examiner

ELECTRIC RESISTANCE WELDED STEEL PIPE OR TUBE AND PRODUCTION METHOD FOR ELECTRIC RESISTANCE WELDED STEEL PIPE OR TUBE

TECHNICAL FIELD

The present disclosure relates to an electric resistance welded steel pipe or tube, and particularly relates to an electric resistance welded steel pipe or tube that has excellent fatigue durability after rapid and short-time heating quenching treatment and is suitable for use as material of a hollow stabilizer and the like. The present disclosure also relates to a production method for the electric resistance welded steel pipe or tube.

BACKGROUND

In recent years, automotive emission control has been tightened for global environment protection, and weight reduction of automotive bodies has been promoted to improve fuel efficiency. One recent method for weight reduction of automotive bodies is to change solid parts to hollow parts. This tendency is also seen in stabilizers which are used to suppress rolling of automotive bodies during cornering or improve stability during high-speed running. Thus, solid stabilizers using steel bars are switched to hollow stabilizers using steel pipes or tubes, for weight reduction of automotive bodies.

A hollow part such as a hollow stabilizer is typically produced by cold forming a steel pipe or tube into a desired shape and then subjecting the steel pipe or tube to quenching or quenching-tempering to impart required strength. As the steel pipe or tube, a seamless steel pipe or tube, an electric resistance welded steel pipe or tube, or a drawn steel pipe or tube obtained by cold drawing the seamless steel pipe or tube or the electric resistance welded steel pipe or tube is mainly used. In particular, electric resistance welded steel pipes or tubes are widely used as material for hollow parts, because they are relatively inexpensive and have excellent dimensional accuracy and surface quality without drawing (JP H01-058264 B2 (PTL 1), JP S61-045688 B2 (PTL 2), and JP H06-093339 A (PTL 3)).

CITATION LIST

Patent Literatures

PTL 1: JP H01-058264 B2
PTL 2: JP S61-045688 B2
PTL 3: JP H06-093339 A
PTL 4: JP 2009-197327 A

SUMMARY

Technical Problem

However, given that further weight reduction of automotive bodies is demanded and more stress tends to be applied to hollow parts recently, the conventional electric resistance welded steel pipes or tubes as described in PTL 1 to PTL 3 lack fatigue durability, especially lack the fatigue durability of an electric resistance weld portion.

One cause for the lack of fatigue durability is insufficient hardenability in the electric resistance weld portion. As mentioned above, a hollow part is typically produced by cold forming a steel pipe or tube and then quenching it. If quenching in the electric resistance weld portion in the electric resistance welded steel pipe or tube is insufficient, the hardness (quenching hardness) of the electric resistance weld portion after the quenching is lower than that of the base metal portion (the portion other than the electric resistance weld portion). Such insufficient quenching hardness in the electric resistance weld portion is particularly noticeable in the case where the electric resistance welded steel pipe or tube is heated rapidly for a short time by electrical resistance heating and quenched (hereafter referred to as "rapid and short-time heating quenching treatment").

This rapid and short-time heating quenching treatment contributes to high productivity and is also effective in suppressing decarburization during heating, and thus is widely used.

Known methods for preventing decarburization during quenching include not only such a method of performing rapid heating to shorten the heating time, but also a method of performing heating in an atmosphere appropriately adjusted so as not to cause decarburization. However, such an atmosphere that does not cause decarburization is usually harmful to humans and induces poisoning and also has high danger of explosion, and accordingly is not easy to handle. Moreover, while the member to be treated needs to be promptly removed from the heating furnace and cooled in order to perform quenching, special measures are necessary in the prompt removal to prevent leakage of atmosphere gas from the furnace and entry of air into the furnace. Such measures are difficult particularly in the case of quenching a part of a long, complex shape such as a hollow stabilizer.

For these reasons, there is a need to solve insufficient quenching hardness in the electric resistance weld portion while using rapid and short-time heating quenching treatment for decarburization prevention.

To solve the problem of the conventional techniques, we developed a technique of suppressing a decrease in quenching hardness in an electric resistance weld portion by controlling heating conditions in rapid and short-time heating quenching treatment (JP 2009-197327 A (PTL 4)). This is a method of adjusting the heating rate, the peak temperature, the soaking time, and the primary cooling rate to the quenching start temperature in the quenching treatment conditions depending on the bond width (corresponding to the carbon-reduced layer width) of the electric resistance weld portion. With this method, C (carbon) enough to ensure sufficient quenching hardness diffuses from the base metal portion into the electric resistance weld portion during heating, as a result of which the hardness of the electric resistance weld portion after the quenching treatment increases and the fatigue durability of the resultant member is improved.

However, the technique described in PTL 4 has the problem of being applicable only to steel pipes or tubes with narrow bond width, such as hot finished electric resistance welded steel pipes or tubes. For typical steel pipes or tubes as electric resistance welded, which are 40 μm or more in bond width, there are no appropriate short-time heating conditions that enable sufficient carbon restoration of the electric resistance weld portion. Although carbon restoration is possible by extending the heating time, decarburization cannot be prevented as a result of the increase of the heating time in such a case. The method thus has the problem of being unable to achieve both improvement in quenching hardness in the electric resistance weld portion and prevention of decarburization in quenching of a member having a typical bond width.

It could therefore be helpful to provide an electric resistance welded steel pipe or tube that can achieve both improvement in quenching hardness in an electric resistance weld portion and prevention of decarburization even with a bond width of $40\times10^{-6}$ m or more and has excellent fatigue durability after rapid and short-time heating quenching treatment. It could also be helpful to provide a production method for the electric resistance welded steel pipe or tube.

In the present disclosure, the term "rapid and short-time heating quenching treatment" denotes quenching treatment under the conditions that the maximum heating temperature is 900° C. or more, the average heating rate from the room temperature to the maximum heating temperature is 10° C./s or more, and the residence time in a temperature range of 900° C. or more is 1 min or less.

Solution to Problem

As a result of examination, we discovered the following.

(1) In quenching of an electric resistance welded steel pipe or tube with a typical bond width, to perform sufficient carbon restoration in order to improve quenching hardness in an electric resistance weld portion, the heating time needs to be increased, which causes decarburization. Decarburization can be prevented by performing heating in an atmosphere that does not cause decarburization. However, since rapid cooling needs to be performed after the heating in the quenching treatment as mentioned above, various measures are needed in order to use an atmosphere that does not cause decarburization.

(2) In the case of subjecting a straight steel pipe or tube before working to heating without rapid cooling, heating using an atmosphere that does not cause decarburization can be easily performed even with a typical furnace.

(3) Accordingly, by performing, prior to rapid and short-time heating quenching treatment, heat treatment (normalizing) under appropriate conditions depending on the bond width in an atmosphere that does not cause decarburization, a sufficient amount of carbon can be diffused into the electric resistance weld portion while preventing decarburization.

(4) The electric resistance welded steel pipe or tube subjected to the heat treatment has high quenching hardness in the electric resistance weld portion after the rapid and short-time heating quenching treatment, and has excellent fatigue durability.

The present disclosure is based on these discoveries. We thus provide the following.

1. An electric resistance welded steel pipe or tube comprising:

a base metal being a steel sheet having a chemical composition containing (consisting of), in mass %, C: 0.15% to 0.40%,
Si: 0.05% to 0.50%,
Mn: 0.30% to 2.00%,
Al: 0.01% to 0.10%,
Ti: 0.001% to 0.04%,
B: 0.0005% to 0.0050%, and
N: 0.0010% to 0.0100%, with a balance consisting of Fe and inevitable impurities, a Ti content and a N content satisfying the following Formula (1), $$(N/14) < (Ti/47.9) \tag{1}$$

where N is the N content in mass % and Ti is the Ti content in mass %, and an electric resistance weld portion having a bond width of $40\times10^{-6}$ m or more and $120\times10^{-6}$ m or less, $C_0$-$C_1$ is 0.05 mass % or less, where $C_0$-$C_1$ is a difference between $C_1$ in mass % which is a minimum C content of the electric resistance weld portion and $C_0$ in mass % which is a C content of the steel sheet, and a depth of a total decarburized layer in each of an inner surface layer and an outer surface layer of the electric resistance welded steel pipe or tube is $50\times10^{-6}$ m or less.

2. The electric resistance welded steel pipe or tube according to 1., wherein the chemical composition further contains, in mass %, one or more selected from the group consisting of Cr: 1.0% or less,
Mo: 1.0% or less,
W: 1.0% or less,
Ni: 1.0% or less, and
Cu: 1.0% or less.

3. The electric resistance welded steel pipe or tube according to 1. or 2., wherein the chemical composition further contains, in mass %, one or both of Nb: 0.2% or less, and
V: 0.2% or less.

4. The electric resistance welded steel pipe or tube according to any one of 1. to 3., wherein the chemical composition further contains, in mass %, Ca: 0.0050% or less.

5. A method of producing an electric resistance welded steel pipe or tube, the method comprising: electric resistance welding a steel sheet to form an electric resistance welded steel pipe or tube that includes an electric resistance weld portion having a bond width of $40\times10^{-6}$ m or more and $120\times10^{-6}$ m or less and in which a depth of a total decarburized layer in each of an inner surface layer and an outer surface layer is $50\times10^{-6}$ m or less, the steel sheet having a chemical composition containing, in mass %, C: 0.15% to 0.40%,
Si: 0.05% to 0.50%,
Mn: 0.30% to 2.00%,
Al: 0.01% to 0.10%,
Ti: 0.001% to 0.04%,
B: 0.0005% to 0.0050%, and
N: 0.0010% to 0.0100%, with a balance consisting of Fe and inevitable impurities, a Ti content and a N content satisfying the following Formula (1)

$$(N/14) < (Ti/47.9) \tag{1}$$

where N is the N content in mass % and Ti is the Ti content in mass %; and thereafter normalizing the electric resistance welded steel pipe or tube under conditions that $C_0$-$C^*_1$ is 0.05 mass % or less where $C_0$-$C^*_1$ is a difference between $C^*_1$ and $C_0$, $C^*_1$ in mass % is a calculated value of a minimum C content of the electric resistance weld portion according to the following Formula (2)

$$C^*_1 = C_0 - (C_0 - 0.09)\mathrm{erf}(h') \tag{2}$$

where $C_0$ is the C content in mass % of the steel sheet,
$h' = h/(Dt)^{1/2}$,
h is the bond width divided by 2 and in units of meters,
D in units of m$^2$/s $= D_0 \exp(-Q/RT)$,
$D_0 = 4.7\times10^{-5}$ m$^2$/s,
Q = 155 kJ/mol·K,
R = 8.31 J/mol·K,
T is a maximum heating temperature in Kelvin in the normalizing, and
t is a time in units of seconds during which the electric resistance welded steel pipe or tube is held in a temperature range of (T−50 K) to T in the normalizing, and $C_0$ in mass % is a C content of the steel sheet, in an atmosphere that is composed of $C_0$, $CO_2$, $H_2$, $H_2O$, and a gas neutral to C and Fe and satisfies the following Formulas (3) and (4), $$(P_{CO})^2/P_{CO2} \geq K \cdot a_C^\gamma \quad (3)$$

$$P_{H2} \cdot P_{CO}/P_{H2O} \geq K' \cdot a_C^\gamma \quad (4)$$

where
$\log(K) = -9460/T - 1.26\log(T) + 13.52$,
$K' = \exp[-(131300 - 134.3\,T)/RT]$,
$a_C^\gamma = x_C^\gamma \cdot \exp[(G_C^\gamma + \Omega_{FeC}^\gamma - G_C^{gr}) \cdot RT] \cdot \exp[(-2\Omega_{FeC}^\gamma \cdot x_C^\gamma + \Sigma W_{MC}^\gamma \cdot X_M^\gamma)/RT]$,
$G_C^\gamma - G_C^{gr} = 73744$ J/mol,
$2\Omega_{FeC}^\gamma = -51956$ J/mol,
$W_{MnC}^\gamma = -41900$ J/mol,
$W_{SiC}^\gamma = +125700$ J/mol,
$W_{CrC}^\gamma = -104750$ J/mol,
$P_{CO}$ is a partial pressure in units of atm of CO in a furnace atmosphere,
$P_{CO2}$ is a partial pressure in units of atm of $CO_2$ in the furnace atmosphere,
$P_{H2}$ is a partial pressure in units of atm of $H_2$ in the furnace atmosphere,
$P_{H2O}$ is a partial pressure in units of atm of $H_2O$ in the furnace atmosphere,
$R = 8.31$ J/mol·K,
T is the maximum heating temperature in Kelvin in the normalizing,
$a_C^\gamma$ is an activity of C in austenite phase,
$x_C^\gamma$ is a mole fraction of C in the austenite phase,
$x_{Si}^\gamma$ is a mole fraction of Si in the austenite phase,
$x_{Mn}^\gamma$ is a mole fraction of Mn in the austenite phase,
$x_{Cr}^\gamma$ is a mole fraction of Cr in the austenite phase,
$G_C^\gamma$ is a free energy of C in the austenite phase, and
$G_C^{gr}$ is a free energy of C in graphite.

6. A method of producing an electric resistance welded steel pipe or tube, the method comprising: electric resistance welding a steel sheet to form an electric resistance welded steel pipe or tube that includes an electric resistance weld portion having a bond width of $40 \times 10^{-6}$ m or more and $120 \times 10^{-6}$ m or less and in which a depth of a total decarburized layer in each of an inner surface layer and an outer surface layer is $50 \times 10^{-6}$ m or less, the steel sheet having a chemical composition containing, in mass %,
C: 0.15% to 0.40%,
Si: 0.05% to 0.50%,
Mn: 0.30% to 2.00%,
Al: 0.01% to 0.10%,
Ti: 0.001% to 0.04%,
B: 0.0005% to 0.0050%, and
N: 0.0010% to 0.0100%,
with a balance consisting of Fe and inevitable impurities, a Ti content and a N content satisfying the following Formula (1)

$$(N/14) < (Ti/47.9) \quad (1)$$

where N is the N content in mass % and Ti is the Ti content in mass %; and thereafter normalizing the electric resistance welded steel pipe or tube under conditions that $C_0 - C^*_1$ is 0.05 mass % or less where $C_0 - C^*_1$ is a difference between $C^*_1$ and $C_0$, $C^*_1$ in mass % is a calculated value of a minimum C content of the electric resistance weld portion according to the following Formula (2)

$$C^*_1 = C_0 - (C_0 - 0.09)\mathrm{erf}(h') \quad (2)$$

where
$C_0$ is the C content in mass % of the steel sheet,
$h' = h/(Dt)^{1/2}$,
h is the bond width divided by 2 and in units of meters,
D in units of $m^2/s = D_0 \exp(-Q/RT)$,
$D_0 = 4.7 \times 10^{-5}$ $m^2/s$,
Q = 155 kJ/mol·K,
R = 8.31 J/mol·K,
T is a maximum heating temperature in Kelvin in the normalizing, and
t is a time in units of seconds during which the electric resistance welded steel pipe or tube is held in a temperature range of (T−50 K) to T in the normalizing and $C_0$ in mass % is a C content of the steel sheet, in an atmosphere that is composed of, in mole fraction in a furnace atmosphere, $H_2$: 0% to 10% and $O_2$: 80 ppm or less with a balance consisting of $H_2O$ and $N_2$ and has a dew point of 0° C. or less.

7. The method of producing an electric resistance welded steel pipe or tube according to 5. or 6., wherein the chemical composition further contains, in mass %, one or more selected from the group consisting of
Cr: 1.0% or less,
Mo: 1.0% or less,
W: 1.0% or less,
Ni: 1.0% or less, and
Cu: 1.0% or less.

8. The method of producing an electric resistance welded steel pipe or tube according to any one of 5. to 7., wherein the chemical composition further contains, in mass %, one or both of
Nb: 0.2% or less, and
V: 0.2% or less.

9. The method of producing an electric resistance welded steel pipe or tube according to any one of 5. to 8., wherein the chemical composition further contains, in mass %,
Ca: 0.0050% or less.

Advantageous Effect

It is thus possible to, even for a typical electric resistance welded steel pipe or tube having a wide carbon-reduced region in an electric resistance weld portion, suppress a decrease in the quenching hardness of the electric resistance weld portion after rapid and short-time heating quenching treatment, and achieve excellent fatigue durability. An electric resistance welded steel pipe or tube according to the present disclosure is therefore very suitable for use as an open pipe or tube for hollow parts such as hollow stabilizers.

BRIEF DESCRIPTION OF THE DRAWINGS

In the accompanying drawings.

DETAILED DESCRIPTION

Figure 1:
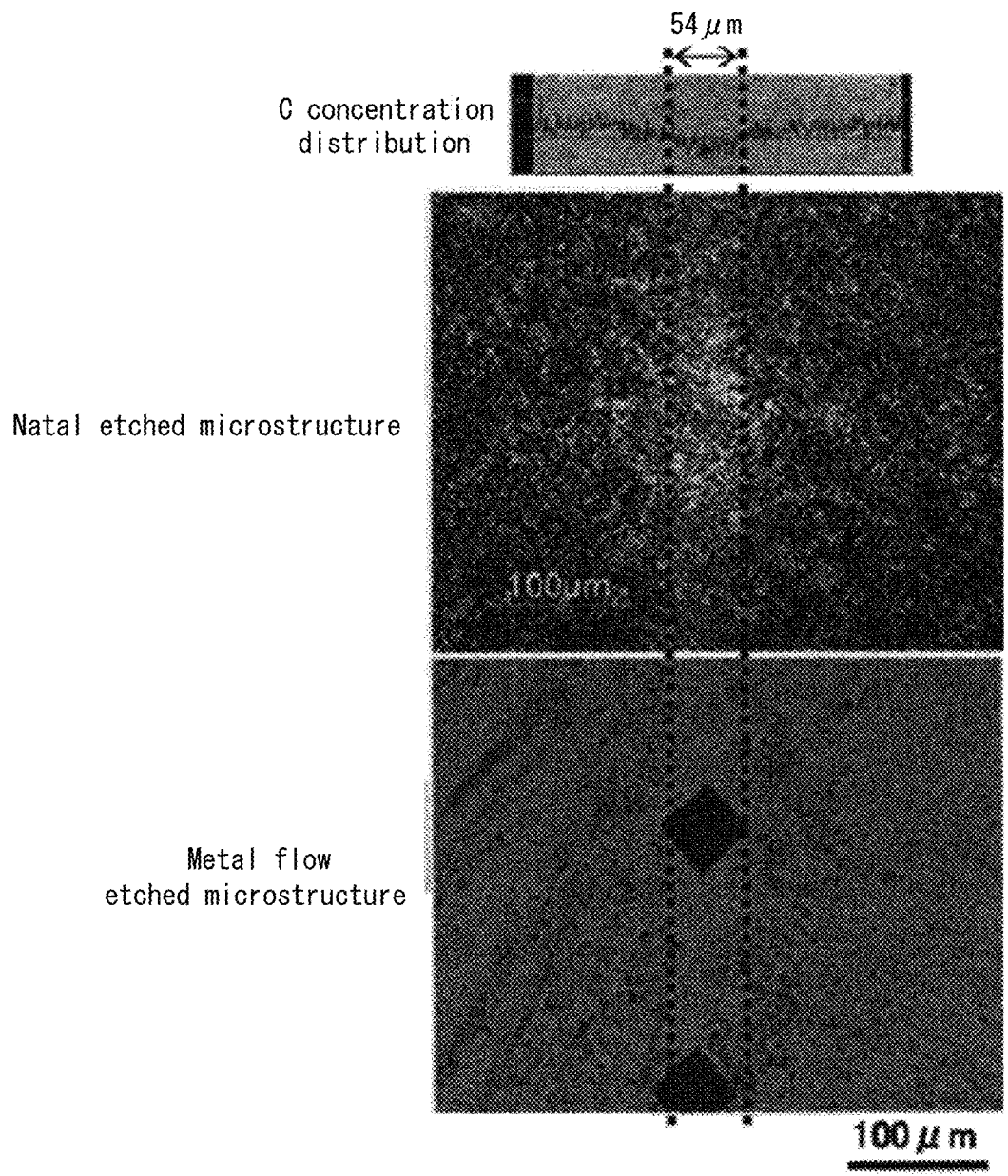
FIG. 1 is a diagram illustrating an example of measurement of a carbon-reduced layer width and a bond width.

A method for carrying out the presently disclosed techniques will be described in detail below.

[Chemical Composition]

An electric resistance welded steel pipe or tube according to the present disclosure has a feature that its base metal is a steel sheet having the foregoing chemical composition. The reasons for limiting the chemical composition to the foregoing range will be described below. In the following description of the chemical composition, "%" denotes "mass %" unless otherwise specified. A steel sheet used as material when producing the electric resistance welded steel pipe or tube can have the same chemical composition as the base metal of the electric resistance welded steel pipe or tube.

C: 0.15% to 0.40%

C is a useful element that increases the strength of the steel as a result of dissolving and precipitates as carbide and/or carbonitride to increase the strength after tempering. To ensure the desired strength of the steel pipe or tube and strength after quenching, the C content is 0.15% or more, and preferably 0.20% or more. If the C content is more than 0.40%, the toughness after quenching treatment decreases. The C content is therefore 0.40% or less, and preferably 0.35% or less.

Si: 0.05% to 0.50%

Si is an element that acts as a deoxidizer. To achieve the effect, the Si content needs to be 0.05% or more. The Si content is therefore 0.05% or more, and preferably 0.10% or more. If the Si content is more than 0.50%, the deoxidizing effect is saturated, and the effect commensurate with the content cannot be expected, which is economically disadvantageous. Besides, inclusions tend to form during electric resistance welding and adversely affect the soundness of the electric resistance weld portion. The Si content is therefore 0.50% or less, and preferably 0.30% or less.

Mn: 0.30% to 2.00%

Mn is an element that increases the strength of the steel as a result of dissolving and improves the hardenability of the steel. To ensure the desired strength, the Mn content is 0.30% or more. If the Mn content is more than 2.00%, retained austenite forms, and the toughness after tempering decreases. The Mn content is therefore 2.00% or less, and preferably 1.60% or less.

Al: 0.01% to 0.10%

Al is an element that acts as a deoxidizer and has an effect of ensuring the amount of solute B effective in hardenability improvement by fixing N. To achieve the effects, the Al content is 0.01% or more, and preferably 0.02 or more. If the Al content is more than 0.10%, more inclusions form, and fatigue life decreases. The Al content is therefore 0.10% or less, and preferably 0.05% or less.

Ti: 0.001% to 0.04%

Ti acts as a N fixing element, and has an effect of ensuring the amount of solute B effective in hardenability improvement. Ti also precipitates as fine carbide, and suppresses coarsening of crystal grains during welding or heat treatment and contributes to improved toughness. To achieve the effects, the Ti content is 0.001% or more, and preferably 0.02% or more. If the Ti content is more than 0.04%, inclusions form considerably, and toughness decreases. The Ti content is therefore 0.04% or less, and preferably 0.03% or less.

B: 0.0005% to 0.0050%

B is an effective element that improves the hardenability of the steel. B also acts to strengthen grain boundaries, and has an effect of preventing quench cracking. To achieve the effects, the B content is 0.0005% or more, and preferably 0.0010% or more. If the B content is more than 0.0050%, the effects are saturated, which is economically disadvantageous. Besides, if the B content is more than 0.0050%, coarse B-containing precipitates form, and toughness decreases. The B content is therefore 0.0050% or less, and preferably 0.0025% or less.

N: 0.0010% to 0.0100%

N is an element that combines with alloying elements in the steel and forms nitride and/or carbonitride to ensure the strength after tempering. To achieve the effect, the N content is 0.0010% or more. If the N content is more than 0.0100%, nitride coarsens, and toughness and fatigue life decrease.

The N content is therefore 0.0100% or less.

The chemical composition of the steel sheet according to one of the disclosed embodiments can contain the elements described above, with the balance consisting of Fe and inevitable impurities. Although the content of the inevitable impurities is not limited, it is preferable to limit the content of each of P, S, and O to the following range independently.

P: 0.020% or less

P is an element that adversely affects weld cracking resistance and toughness. The P content as an inevitable impurity is therefore preferably limited to 0.020% or less, and more preferably limited to 0.015% or less. P is an impurity element, and the P content is desirably as low as possible. Accordingly, no lower limit is placed on the P content, and the P content may be 0. Excessive reduction, however, can cause an increase in cost. Hence, in terms of cost reduction, the P content is preferably 0.001% or more, and more preferably 0.005% or more.

S: 0.010% or less

S is an element that exists as a sulfide-based inclusion in the steel and decreases the workability, toughness, and fatigue life of the steel pipe or tube and increases reheating crack sensitivity. The S content as an inevitable impurity is therefore preferably limited to 0.010% or less, and more preferably limited to 0.005% or less. S is an impurity element, and the S content is desirably as low as possible. Accordingly, no lower limit is placed on the S content, and the S content may be 0. Excessive reduction, however, can cause an increase in cost. Hence, in terms of cost reduction, the S content is preferably 0.0005% or more, and more preferably 0.0010% or more.

O: 0.005% or less

O is an element that exists in the steel mainly as an oxide-based inclusion and decreases the workability, toughness, and fatigue life of the steel pipe or tube. The O content as an inevitable impurity is therefore preferably limited to 0.005% or less, and more preferably limited to 0.0021% or less. O is an impurity element, and the O content is desirably as low as possible. Accordingly, no lower limit is placed on the O content, and the O content may be 0. Excessive reduction, however, can cause an increase in cost. Hence, in terms of cost reduction, the O content is preferably 0.0005% or more, and more preferably 0.0010% or more.

In another one of the disclosed embodiments, the foregoing chemical composition may optionally further contain one or more selected from the group consisting of Cr, Mo, W, Ni, and Cu each in the following content.

Cr: 1.0% or less

Cr is an element that has an action of forming fine carbide and increasing strength, in addition to improving hardenability. If the Cr content is more than 1.0%, the effects are saturated, which is economically disadvantageous. Besides, inclusions tend to form during electric resistance welding and adversely affect the soundness of the electric resistance weld portion. Accordingly, in the case of adding Cr, the Cr content is 1.0% or less, and preferably 0.30% or less. Although no lower limit is placed on the Cr content, in terms of achieving sufficient effect of adding Cr, the Cr content is preferably 0.05% or more, and more preferably 0.10% or more.

Mo: 1.0% or less

Mo is an element that has an action of forming fine carbide and increasing strength, in addition to improving hardenability. If the Mo content is more than 1.0%, the effects are saturated, which is economically disadvantageous. Besides, coarse carbide forms, and toughness decreases. Accordingly, in the case of adding Mo, the Mo content is 1.0% or less, and preferably 0.30% or less. Although no lower limit is placed on the Mo content, in terms of achieving sufficient effect of adding Mo, the Mo content is preferably 0.05% or more, and more preferably 0.10% or more.

W: 1.0% or less

W is an element that has an action of improving the balance between hardness and toughness after thermal refining treatment, in addition to improving hardenability. If the W content is more than 1.0%, the effects are saturated, which is economically disadvantageous. Accordingly, in the case of adding W, the W content is 1.0% or less, and preferably 0.30% or less. Although no lower limit is placed on the W content, in terms of achieving sufficient effect of adding W, the W content is preferably 0.05% or more, and more preferably 0.10% or more.

Ni: 1.0% or less

Ni is an element that contributes to improved toughness, in addition to improving hardenability. If the Ni content is more than 1.0%, the effects are saturated, which is economically disadvantageous. Besides, workability decreases. Accordingly, in the case of adding Ni, the Ni content is 1.0% or less, and preferably 0.50% or less. Although no lower limit is placed on the Ni content, in terms of achieving sufficient effect of adding Ni, the Ni content is preferably 0.05% or more, and more preferably 0.10% or more.

Cu: 1.0% or less

Cu is an element that is effective in delayed fracture prevention, in addition to improving hardenability. If the Cu content is more than 1.0%, the effects are saturated, which is economically disadvantageous. Besides, workability decreases. Accordingly, in the case of adding Cu, the Cu content is 1.0% or less, and preferably 0.30% or less. Although no lower limit is placed on the Cu content, in terms of achieving sufficient effect of adding Cu, the Cu content is preferably 0.05% or more, and more preferably 0.10% or more.

In another one of the disclosed embodiments, the foregoing chemical composition may optionally further contain one or both of Nb and V each in the following content.

Nb: 0.2% or less

Nb is an element that forms carbide and contributes to higher strength, and may be optionally contained. If the Nb content is more than 0.2%, the effect is saturated, which is economically disadvantageous. Accordingly, in the case of adding Nb, the Nb content is 0.2% or less. Although no lower limit is placed on the Nb content, in terms of achieving sufficient effect of adding Nb, the Nb content is preferably 0.01% or more.

V: 0.2% or less

V is an element that forms carbide and contributes to higher strength as with Nb, and may be optionally contained. If the V content is more than 0.2%, the effect is saturated, which is economically disadvantageous. Accordingly, in the case of adding V, the V content is 0.2% or less. Although no lower limit is placed on the V content, in terms of achieving sufficient effect of adding V, the V content is preferably 0.01% or more.

In another one of the disclosed embodiments, the foregoing chemical composition may optionally further contain Ca in the following content.

Ca: 0.0050% or less

Ca is an element that controls the chemical form of inclusions such as sulfide and improves workability, and may be optionally contained. If the Ca content is more than 0.0050%, the cleanliness of the steel decreases. Accordingly, in the case of adding Ca, the Ca content is 0.0050% or less, and preferably 0.0010% or less. Although no lower limit is placed on the Ca content, in terms of achieving sufficient effect of adding Ca, the Ca content is preferably 0.0001% or more, and more preferably 0.0003% or more.

Relationship between Ti content and N content

In the present disclosure, the Ti content and the N content in the chemical composition of the steel sheet need to satisfy the following Formula (1):

$$(N/14) < (Ti/47.9) \tag{1}$$

where N denotes the N content (mass %) and Ti denotes the Ti content (mass %).

B is an element that has an action of improving hardenability as described above, but, when B combines with N and precipitates as BN, the hardenability improving effect decreases significantly. In the case where the Ti content and the N content do not satisfy Formula (1), fixing of N by Ti is insufficient, and the amount of solute B in quenching cannot be ensured.

In other words, R defined by the following Formula (a) needs to be less than 1. In terms of further ensuring the amount of solute B in quenching, R is preferably 0.90 or less, and more preferably 0.80 or less. While no lower limit is placed on R, the N content and the Ti content each need to be within the foregoing range.

$$R = (N/14)/(Ti/47.9) \tag{a}$$

In one of the disclosed embodiments, a steel sheet may be used which has a chemical composition that, in mass %, contains C: 0.15% to 0.40%,
Si: 0.05% to 0.50%,
Mn: 0.30% to 2.00%,
Al: 0.01% to 0.10%,
Ti: 0.001% to 0.04%,
B: 0.0005% to 0.0050%, and
N: 0.0010% to 0.0100%, optionally contains one or more selected from the group consisting of Cr: 1.0% or less, Mo: 1.0% or less, W: 1.0% or less, Ni: 1.0% or less, and Cu: 1.0% or less, optionally contains one or both of Nb: 0.2% or less and V: 0.2% or less, and optionally contains Ca: 0.0050% or less, with the balance consisting of Fe and inevitable impurities, wherein the Ti content and the N content satisfy Formula (1).

[Electric Resistance Weld Portion]

The electric resistance welded steel pipe or tube according to the present disclosure has a feature that the bond width and the C content of the electric resistance weld portion satisfy the following conditions.

[Bond Width]

The electric resistance welded steel pipe or tube is produced by forming the steel sheet as material into an approximately cylindrical open pipe or tube that is a cylindrical strip before welding and then butting the ends of the open pipe or tube together and electric resistance welding them. In the electric resistance weld portion of the resultant electric resistance welded steel pipe or tube, a carbon-reduced layer whose C content is less than that of the base metal is formed. The width of the carbon-reduced layer and the C content in the carbon-reduced layer significantly influence the properties of the electric resistance welded steel pipe or tube.

The width of the carbon-reduced layer can be measured by various methods, such as a method of analyzing the amount of C by EPMA (Electron Probe Micro Analyzer) as illustrated in the upper part of FIG. 1 and a method of measuring the width of a white layer observed by nital etching the weld as illustrated in the middle part of FIG. 1. For an electric resistance welded steel pipe or tube whose amount of C is less than 0.30% and that is as electric resistance welded or has been subjected to only heat treatment at a temperature of less than 800° C., by performing metal flow etching as illustrated in the lower part of FIG. 1, the width of a bond portion which is a region where no segregation lines are observed can be measured relatively easily and clearly. The width of the bond portion (bond width) closely matches the width of the carbon-reduced layer measured by the foregoing method. For an electric resistance welded steel pipe or tube whose amount of C is 0.30% or more, the width of the carbon-reduced layer measured by EPMA or the width of the white layer observed as a result of nital etching is used as the bond width.

Bond width: $40\times10^{-6}$ m or more and $120\times10^{-6}$ m or less

The bond width is preferably narrow, in terms of the quenching hardness of the electric resistance weld portion. The bond width is therefore $120\times10^{-6}$ m or less. If the bond width is excessively narrow, workability and robustness during electric resistance welding decrease. The bond width is therefore $40\times10^{-6}$ m or more. The bond width can be measured by the foregoing method, specifically, the method described in the EXAMPLES section.

The technique described in PTL 4 can be applied only to steel pipes or tubes with narrow bond width, to enable sufficient carbon restoration in rapid and short-time heating quenching treatment. Hence, according to PTL 4, the steel pipe or tube is subjected to working such as diameter-reducing rolling to narrow the bond width. Even when the quenching treatment described in PTL 4 is performed on a typical steel pipe or tube having a bond width of $40\times10^{-6}$ m or more without working such as diameter-reducing rolling, a steel pipe or tube satisfying the conditions according to the present disclosure cannot be produced.

[C content]

$C_0-C_1$: 0.05 mass % or less

If the C content in the electric resistance weld portion is low, hardenability is insufficient, and the hardness of the electric resistance weld portion after quenching is insufficient. To ensure the quenching hardness of the electric resistance weld portion and improve the fatigue strength, $C_0-C_1$, i.e. the difference between $C_1$ (mass %) which is the minimum C content of the electric resistance weld portion and $C_0$ (mass %) which is the C content of the steel sheet as the base metal, is 0.05 mass % or less, and preferably 0.04 mass % or less. $C_0-C_1$ is desirably as low as possible, in terms of ensuring the quenching hardness of the electric resistance weld portion. Hence, no lower limit is placed on $C_0-C_1$. Typically, however, $C_0>C_1$, and therefore $C_0-C_1$ may be more than 0 mass %. In terms of easiness of production, $C_0-C_1$ is preferably 0.01 mass % or more, and more preferably 0.02 mass % or more. $C_1$ which is the minimum C content of the electric resistance weld portion can be determined by measuring the C content in the electric resistance weld portion by EPMA along the pipe or tube circumferential direction at a position of 200 µm (depth: 200 µm) in the thickness direction from the outer surface of the steel pipe or tube.

[Depth of Total Decarburized Layer]

Total decarburization depth: $50\times10^{-6}$ m or less

If the depth of the total decarburized layer is large, the hardness after quenching decreases, and fatigue strength cannot be ensured. Accordingly, the depth of the total decarburized layer in each of the inner surface layer and the outer surface layer of the electric resistance welded steel pipe or tube is $50\times10^{-6}$ m or less, and preferably $30\times10^{-6}$ m or less. Although no lower limit is placed on the total decarburization depth, in terms of easiness of production, the depth of the total decarburized layer in each of the inner surface layer and the outer surface layer is preferably $6\times10^{-6}$ m or more, and more preferably $12\times10^{-6}$ m or more.

The depth of the total decarburized layer is influenced by the heat treatment conditions. However, by performing normalizing under the below-described conditions, decarburization can be prevented and the depth of the total decarburized layer can be limited to the foregoing range. The decarburized layer depth is also influenced by the decarburized layer depth of a steel strip used as the material of the electric resistance welded steel pipe or tube. Hence, for example in the case of using a hot-rolled steel sheet as the material, it is preferable to lower the coiling temperature in the production of the hot-rolled steel sheet or perform high-pressure descaling to reduce scale thickness.

The depth of the total decarburized layer can be measured in accordance with the "microscopic measurement method" defined in JI G 0558 "Steels-Determination of depth of decarburization". Specific measurement can be performed by the method described in the EXAMPLES section.

[Outer Diameter and Thickness]

The outer diameter (D) of the electric resistance welded steel pipe or tube according to the present disclosure is not limited, and may be any value.

The outer diameter is preferably 20 mm or more. The outer diameter is preferably 40 mm or less. The thickness (t) of the electric resistance welded steel pipe or tube according to the present disclosure is not limited, and may be any value. The thickness is preferably 2 mm or more, the thickness is preferably 8 mm or less. The ratio (t/D) of the thickness t to the outer diameter D is preferably 0.14 or more. The ratio (t/D) is preferably 0.28 or less.

[Production Method]

A production method for an electric resistance welded steel pipe or tube according to one of the disclosed embodiments will be described below.

The electric resistance welded steel pipe or tube according to the present disclosure can be obtained by electric resistance welding a steel sheet as material to form an electric resistance welded steel pipe or tube and normalizing the electric resistance welded steel pipe or tube under specific conditions. Each process will be described in detail below.

[Steel Sheet]

The steel sheet as material may be any steel sheet such as a hot-rolled steel sheet or a cold-rolled steel sheet, as long as it has the foregoing chemical composition. A hot-rolled steel sheet is preferably used. Herein, the term "steel sheet" includes "steel strip".

[Electric Resistance Welding]

The steel sheet is electric resistance welded to obtain an electric resistance welded steel pipe or tube. The method of electric resistance welding is not limited. Typically, the steel sheet is roll formed to obtain an approximately cylindrical open pipe or tube, and then the ends of the open pipe or tube are butted together and electric resistance welding is performed. The butted surfaces are typically formed from surfaces as sheared. In terms of preventing welding defects, it is also preferable to form the butted surfaces by cutting. The electric resistance welding is preferably performed by high frequency resistance welding. Particularly in terms of preventing surface defects, induction heating is preferable to contact electrode type. After the electric resistance welding, not only the outer surface but also the inner surface is preferably subjected to bead cutting so that no convex portions remain, given that such convex portions can be a destabilizing factor for the durability of the electric resistance weld portion. Before working into the electric resistance welded steel pipe or tube, the blank steel sheet is preferably subjected to descaling. The descaling may be performed by any method such as pickling.

Here, the bond width of the electric resistance welded steel pipe or tube is set to $40 \times 10^{-6}$ m or more and $120 \times 10^{-6}$ m or less, and the depth of the total decarburized layer in each of the inner surface layer and the outer surface layer of the electric resistance welded steel pipe or tube is set to $50 \times 10^{-6}$ m or less. The reasons for limiting the bond width and the depth of the total decarburized layer to these ranges are as described above.

[Normalizing]

The obtained electric resistance welded steel pipe or tube is then subjected to normalizing (pre-quenching heat treatment). In the present disclosure, it is important to control the heating conditions and the atmosphere in the normalizing as follows.

[Heating conditions]

The normalizing is performed under the conditions that $C_0 - C^*_1$, i.e. the difference between $C^*_1$ (mass %) which is a calculated value of the minimum C content of the electric resistance weld portion according to the following Formula (2) and $C_0$ (mass %) which is the C content of the steel sheet, is 0.05 mass % or less.

$$C^*_1 = C_0 - (C_0 - 0.09)\mathrm{erf}(h') \quad (2)$$

where $C_0$ is the C content (mass %) of the steel sheet,
$h' = h/(Dt)^{1/2}$,
h (m) is (bond width)/2,
D (m²/s) = $D_0 \exp(-Q/RT)$,
$D_0 = 4.7 \times 10^{-5}$ m²/s,
Q=155 kJ/mol·K,
R=8.31 J/mol·K,
T is the maximum heating temperature (K) in the normalizing, and t (s) is the time during which the electric resistance welded steel pipe or tube is held in a temperature range of (T−50 K) to T in the normalizing.

The values $D_0$, Q, and R are quoted from the Japan Institute of Metals and Materials ed., Metal data book (2nd edition), p. 26, 1984, Maruzen. Q is activation energy of diffusion of C in austenite phase. In Formula (2), "erf" is an error function.

Formula (2) is a formula for calculating the C content at the bond width center position after the normalizing based on the diffusion of C during the normalizing. The use of Formula (2) enables estimation of the minimum C content ($C^*_i$) in the electric resistance weld portion after the normalizing. Thus, by selecting the heating conditions depending on the bond width so that $C_0 - C^*_1$ is 0.05 mass % or less, $C_0 - C_1$ can be limited to 0.05 mass % or less, where $C_0 - C_1$ is the difference between $C_1$ (mass %) which is the actual minimum C content in the electric resistance weld portion of the electric resistance welded steel pipe or tube after the normalizing and $C_0$ (mass %) which is the C content of the steel sheet.

The normalizing can be performed by any method, as long as the foregoing conditions are satisfied. Specifically, the steel pipe or tube may be heated to the maximum heating temperature T, held (soaked) at the maximum heating temperature, and then cooled, as in typical normalizing. The conditions of the cooling are not limited, and may be determined depending on the chemical composition of the steel pipe or tube and the heating temperature.

However, if the cooling rate to 650° C. in the cooling is excessively high, hard phase such as bainite or martensite forms in some cases. When hard phase forms, workability of bending performed for a stabilizer, swaging performed for a drive shaft, etc. decreases. Accordingly, in the cooling, the average cooling rate from the cooling start to 650° C. is preferably 10° C./s or less. If the average cooling rate from the cooling start to 650° C. is 10° C./s or less, microstructure composed of one or both of ferrite and pearlite and containing no hard phase can be obtained.

In terms of decarburization prevention, in the cooling, the steel pipe or tube is preferably cooled in the below-described first atmosphere or second atmosphere at least until 650° C. is reached, and more preferably cooled in the below-described first atmosphere or second atmosphere at least until 450° C. is reached.

The normalizing can be performed using any line, as long as the foregoing atmosphere is usable. In terms of productivity, a continuous-type heat treatment furnace (continuous furnace) is preferably used. In terms of atmosphere control, a bright annealing furnace commonly used for bright annealing is preferably used for the heat treatment.

[Atmosphere]

The normalizing needs to be performed in an atmosphere that does not cause decarburization. If the atmosphere is not appropriate, decarburization of the base metal portion which is a supply source of carbon for carbon restoration to the electric resistance weld portion progresses, and carbon restoration to the electric resistance weld portion does not progress. Examples of the atmosphere that does not cause decarburization include the following two atmospheres.

(First Atmosphere)

In one of the disclosed embodiments, the normalizing can be performed in an atmosphere that is composed of CO, $CO_2$, $H_2$, $H_2O$, and a gas neutral to C and Fe and satisfies the following Formulas (3) and (4):

$$(P_{CO})^2 / P_{CO2} \geq K \cdot a_C^\gamma \quad (3)$$

$$P_{H2} \cdot P_{CO} / P_{H2O} \geq K' \cdot a_C^\gamma \quad (4)$$

where $\log(K) = -9460/T - 1.26 \log(T) + 13.52$,
$K' = \exp[-(131300 - 134.3\,T)/RT]$,
$a_C^\gamma = x_C^\gamma \cdot \exp[(G_C^\gamma + \Omega_{FeC}^\gamma - G_C^{gr}) \cdot RT] \cdot \exp[(-2\Omega_{FeC}^\gamma \cdot x_C^\gamma + \Sigma W_{MC}^\gamma \cdot x_M^\gamma)/RT]$,
$G_C^\gamma - G_C^{gr} = 73744$ J/mol,
$2\Omega_{FeC}^\gamma = -51956$ J/mol,
$W_{MnC}^\gamma = -41900$ J/mol, $W_{SiC}^\gamma = +125700$ J/mol,
$W_{CrC}^\gamma = -104750$ J/mol,
$P_{CO}$ (atm) is the partial pressure of CO in the furnace atmosphere,
$P_{CO2}$ (atm) is the partial pressure of $CO_2$ in the furnace atmosphere,
$P_{H2}$ (atm) is the partial pressure of $H_2$ in the furnace atmosphere,
$P_{H2O}$ (atm) is the partial pressure of $H_2O$ in the furnace atmosphere,
R=8.31 J/mol·K,
T is the maximum heating temperature (K) in the normalizing,
$a_C^\gamma$ is the activity of C in austenite phase,
$x_C^\gamma$ is the mole fraction of C in austenite phase,
$x_{Si}^\gamma$ is the mole fraction of Si in austenite phase,
$x_{Mn}^\gamma$ is the mole fraction of Mn in austenite phase,
$x_{Cr}^\gamma$ is the mole fraction of Cr in austenite phase,
$G_C^{gr}$ is the free energy of C in austenite phase, and
$G_C^{gr}$ is the free energy of C in graphite.

$G_C^\gamma$ is the free energy of C in austenite phase, and $G_C^{gr}$ is the free energy of C in graphite. $\Omega_{FeC}^\gamma$ is an interaction coefficient between C and Fe in austenite phase, and $W_{MC}^\gamma$ is an interaction coefficient between C and element A in austenite phase. "$\Sigma W_{MC}^\gamma \cdot x_M^\gamma$" denotes the sum of "$W_{MC}^\gamma \cdot x_M^\gamma$" in the cases where M=Mn, Si, and Cr.

The reason that the parameters in austenite phase are used is because, when the steel pipe or tube formed by the steel sheet having the foregoing chemical composition is subjected to normalizing, the microstructure of the steel becomes a microstructure substantially composed of austenite single phase. Accordingly, the mole fractions of C, Si, Mn, and Cr in austenite phase are equal to the mole fractions of the respective elements in the steel. Thus, in the calculation of Formulas (3) and (4), the values of the mole fractions in the steel can be used as the mole fractions in austenite phase. Moreover, since austenite single phase is formed as a result of the normalizing as mentioned above, the microstructure of the steel before the normalizing can be any microstructure.

The method of preparing the atmosphere is not limited, and may be any method. Typically, the atmosphere can be prepared by removing $CO_2$ and $H_2O$ from gas obtained by incompletely combusting methane, propane, or the like. As the gas neutral to C and Fe, for example, one or both of $N_2$ and Ar may be used.

(Second Atmosphere)

In one of the disclosed embodiments, the normalizing can be performed in an atmosphere that contains, in mole fraction, $H_2$: 0% to 10% and $O_2$: 80 ppm or less with the balance consisting of $H_2O$ and $N_2$ and has a dew point of 0° C. or less.

$H_2$ is a component that can be added optionally, and its mole fraction may be 0. However, $H_2$ is a component having an effect of suppressing oxidation or decarburization of the steel pipe or tube, and therefore is preferably added. Specifically, the mole fraction of $H_2$ is preferably 1% or more, and more preferably 2% or more. If $H_2$ is added excessively, the additive effect is saturated, and an explosion tends to occur. The mole fraction of $H_2$ is therefore 10% or less, preferably 7% or less, and more preferably 5% or less.

$O_2$ and $H_2O$ are components that cause decarburization. $O_2$ and $H_2O$ also oxidize iron to form oxide scale, and, in the case where oxidation is significant, cause a decrease in surface properties such as an increase of surface roughness. The amounts of $O_2$ and $H_2O$ in the atmosphere are therefore desirably low. Specifically, if the mole fraction of $O_2$ is more than 80 ppm, these adverse effects are noticeable. The mole fraction of $O_2$ is therefore 80 ppm or less, preferably 40 ppm or less, and more preferably 20 ppm or less. Regarding $H_2O$, if the dew point is more than 0° C., the adverse effects are noticeable. The dew point is therefore 0° C. or less, preferably −20° C. or less, and more preferably −40° C. or less. In terms of easiness of atmosphere adjustment, the dew point is preferably −60° C. or more, and more preferably −50° C. or more.

By performing the normalizing in any of the first atmosphere and the second atmosphere, decarburization during the normalizing can be prevented. Thus, by using, as a blank steel sheet, an electric resistance welded steel pipe or tube in which the depth of the total decarburized layer in each of the inner surface layer and the outer surface layer is $50 \times 10^{-6}$ m or less and performing normalizing in the atmosphere, the depth of the total decarburized layer in each of the inner surface layer and the outer surface layer of the electric resistance welded steel pipe or tube after the normalizing can be limited to $50 \times 10^{-6}$ m or less.

The electric resistance welded steel pipe or tube according to the present disclosure can be produced according to the procedure described above. The electric resistance welded steel pipe or tube obtained in this way has excellent fatigue durability after rapid and short-time heating quenching treatment, and is suitable for use as material of a hollow stabilizer and the like.

[Hollow Part]

The electric resistance welded steel pipe or tube produced in the foregoing manner can be used for any applications. As an example, the electric resistance welded steel pipe or tube can be used as material of a hollow part such as a hollow stabilizer as mentioned above.

Specifically, it is preferable to work the electric resistance welded steel pipe or tube into a desired member shape and then subject the electric resistance welded steel pipe or tube to rapid and short-time heating quenching treatment. The working may be any working, but cold working is preferably used.

[Rapid and Short-Time Heating Quenching]

The rapid and short-time heating quenching treatment is performed under the conditions that the maximum heating temperature is 900° C. or more, the average heating rate from the room temperature to the maximum heating temperature is 10° C./s or more, and the residence time in a temperature range of 900° C. or more is 1 min or less. As a result of performing quenching under the conditions, a part having desired strength can be obtained while preventing decarburization. The heating in the quenching may be performed by any method, such as high-frequency heating or electrical resistance heating.

The quenching start temperature Tq in the rapid and short-time heating quenching treatment is higher than the Ar3 transformation point of the electric resistance weld portion. If Tq is not higher than the Ar3 transformation point of the electric resistance weld portion, ferrite transformation or bainite transformation occurs before the start of quenching (rapid cooling), as a result of which the electric resistance weld portion cannot have a microstructure composed of 100% martensite. Consequently, the desired quenching hardness cannot be ensured, and the fatigue durability decreases.

Herein, the Ar3 transformation point of the electric resistance weld portion is a value calculated according to the following Formula (5). This value deviates from the actual Ar3 transformation point to the high temperature side, and thus is a value on the safe side in the determination of the rapid cooling start temperature. The calculation formula of the Ac3 transformation point is quoted from William C. Leslie, The Physical Metallurgy of Steels (trans. by N. Koda: 1985, Maruzen, p. 273).

$$\text{Ac3 transformation point (° C.)} = 910 - 203(C^{1/2}) - 15.2Ni + 44.7Si + 104V + 31.5Mo + 13.1W - (30Mn + 11Cr + 20Cu - 700P - 400Al - 120As - 400Ti) \quad (5)$$

where the element symbols denote the contents (mass %) of the respective elements, and the content of any element not contained is assumed to be 0.

The cooling rate in the quenching may be any cooling condition with which 100% martensite microstructure can be formed. Although the cooling condition with which 100% martensite microstructure is obtained depends on the chemical composition of the steel sheet as the material, in the present disclosure, it is preferable to cool the electric resistance welded steel pipe or tube from the quenching start temperature Tq to the room temperature at an average cooling rate of 30° C./s or more and preferably 80° C./s or more.

The rapid cooling (secondary cooling) in the quenching treatment is preferably performed using a coolant such as water or a mixture of water and a polymer, in terms of productivity and maintenance. To suppress quench cracking or deformation or residual stress during quenching, oil quenching may be used.

[Tempering]

After the rapid and short-time heating quenching, tempering treatment to improve toughness may be optionally performed. The heating temperature (tempering temperature) in the tempering treatment is preferably 150° C. to 450° C. If the heating temperature is less than 150° C., the desired toughness may not be ensured. If the heating temperature is more than 450° C., the hardness may decrease and the desired durability may not be ensured.

EXAMPLES

More detailed description will be given below by way of examples.

Using hot-rolled steel sheets having the chemical compositions listed in Table 1 as material, electric resistance welded steel pipes or tubes were produced according to the following procedure. First, each hot-rolled steel sheet was pickled, and scale was removed. The hot-rolled steel sheet was then subjected to continuous cold roll forming, to obtain an approximately cylindrical open pipe or tube. The ends of the open pipe or tube were then butted together, and electric resistance welding was performed by high frequency resistance welding to obtain an electric resistance welded steel pipe or tube. The obtained electric resistance welded steel pipe or tube had an outer diameter of 25.4 mm and a thickness of 4.5 mm.

(Bond Width)

In the electric resistance welding, the welding conditions were changed to adjust the bond width of the electric resistance weld portion to the value listed in Tables 2 and 3. The bond width was determined by collecting a test piece for microstructure observation including the electric resistance weld portion from the obtained electric resistance welded steel pipe or tube and performing microstructure observation. The test piece for microstructure observation was cut out so that a cross-section perpendicular to the longitudinal (pipe or tube axial) direction of the electric resistance welded steel pipe or tube was the observation plane. The cross-section of the cut test piece was polished.

In the case where the C content of the steel sheet is less than 0.30%

The surface of the test piece after the polishing was etched using a metal flow etching solution (5% picric acid+surfactant). After this, the cross-sectional microstructure was observed using an optical microscope (magnification: 400 times). The maximum width of a region (layer) in which no segregation line was observed in the cross-sectional microstructure was measured and taken to be the bond width.

In the case where the C content of the steel sheet is 0.30% or more

The surface of the test piece after the polishing was etched using a nital etching solution (5% nitric acid alcohol). After this, the cross-sectional microstructure was observed using an optical microscope (magnification: 400 times). The maximum width of a region (white layer) observed bright in the cross-sectional microstructure was measured and taken to be the bond width.

(Depth of Decarburized Layer Before Normalizing)

For each obtained electric resistance welded steel pipe or tube (before normalizing), the depth of the total decarburized layer in each of the inner surface layer and the outer surface layer was measured in accordance with the "microscopic measurement method" defined in JIS G 0558 "Steels-Determination of depth of decarburization". In the measurement, the electric resistance welded steel pipe or tube was cut at the center in the longitudinal direction, and the maximum value of the decarburized layer depth in the cross-section was adopted. The depth of the decarburized ferrite layer was also measured by the same method. The measurement results are listed in Tables 2 and 3.

(Normalizing)

The electric resistance welded steel pipe or tube (as electric resistance welded) after the electric resistance welding was then subjected to normalizing under the conditions listed in Tables 2 and 3. The normalizing included the following processes (1) to (3):

(1) heating from the room temperature to the maximum heating temperature T (° C.) at an average heating rate of 5 (° C./s), (2) holding at the maximum heating temperature T (° C.) for a predetermined soaking time, and (3) cooling to the room temperature at an average cooling rate of 3 (° C./s).

t (s) defined as the time during which the steel pipe or tube was held in a temperature range of (T-50 K) to T in the processes (1) to (3) is as listed in Tables 2 and 3. In Tables 2 and 3, the maximum heating temperature T was expressed not in absolute temperature (K) but in degree Celsius (° C.), for the sake of convenience.

From the bond width and the heating conditions listed in Tables 2 and 3, $C^*_1$ (mass %) which is a calculated value of the minimum C content of the electric resistance weld portion was calculated according to Formula (2). The obtained value of $C^*_1$ and the value of $C_0 - C^*_1$, i.e. the difference between $C^*_1$ and CO which is the C content of the steel sheet, are listed in Tables 2 and 3. As CO which is the C content of the steel sheet, the value of the C content in Table 1 was used.

As the atmosphere in the normalizing, an atmosphere of the composition listed in Tables 4 and 5 was used. The atmosphere in Table 4 corresponds to the first atmosphere, and is composed of $C_0$, $CO_2$, $H_2$, $H_2O$, and $N_2$. $N_2$ is a gas neutral to C and Fe. The atmosphere in Table 5 corresponds to the second atmosphere, and is composed of $H_2$, $O_2$, $H_2O$, and the balance consisting of $N_2$. In Table 5, the amount of $H_2O$ is shown as dew point.

For each obtained electric resistance welded steel pipe or tube after the normalizing, $C_1$ (mass %) which is the minimum C content of the electric resistance weld portion was measured. The measurement method is as follows. The measurement was performed before the below-described quenching treatment.

(Minimum C Content of the Electric Resistance Weld Portion: $C_1$)

The C content in the electric resistance weld portion of the obtained electric resistance welded steel pipe or tube was determined based on the result of EPMA measurement. The measurement position was a position of 200 µm (depth: 200 µm) in the thickness direction from the outer surface in a cross-section perpendicular to the longitudinal direction of the steel pipe or tube and including the electric resistance weld portion. The measurement was performed according to the following procedure. First, a sample was cut out of the electric resistance welded steel pipe or tube so that a cross-section perpendicular to the longitudinal direction was the measurement position.

Next, the cross-section was subjected to EPMA measurement in lines of bond width+200 µm in length in the circumferential direction centering at the bond portion, to measure the X-ray intensity derived from C. Following this, the average value A of X-ray intensities in a range of ±(bond width×0.4) centering at the bond portion in the lines was calculated. Further, the average value B of X-ray intensities in a range of a position 20 µm away from the end of the bond portion to a position 80 µm away from the end of the bond portion in the lines was calculated. The measurement position of the average intensity B corresponds to the base metal portion.

This measurement was conducted for three cross-sections, and the average value of A and the average value of B in the three cross-sections were calculated. $C_1$ which is the minimum C content of the electric resistance weld portion was calculated as the C content of the steel sheet: $C_0$×(average value of A)/(average value of B).

The value of $C_0$–$C_1$, i.e. the difference between $C_1$ which is the obtained minimum C content of the electric resistance weld portion and $C_0$ which is the C content of the steel sheet, is listed in Tables 6 and 7. As $C_0$ which is the C content of the steel sheet, the value of the C content in Table 1 was used. Each measured value of $C_0$-$C_1$ in Tables 6 and 7 closely matches the calculated value of $C_0$-$C^*_1$ in Tables 2 and 3, except Comparative Examples Nos. 7 to 9, 21, and 22 in which the normalizing atmosphere was outside the range according to the present disclosure and decarburization progressed. This demonstrates that, in the case where the normalizing atmosphere is within the range according to the present disclosure, the minimum C content of the electric resistance weld portion after the normalizing can be estimated using Formula (2).

(Depth of Decarburized Layer)

For each obtained electric resistance welded steel pipe or tube (after normalizing and before quenching), the depth of the total decarburized layer and the depth of the decarburized ferrite layer in each of the inner surface layer and the outer surface layer were measured. The measurement was performed by the same method as in the measurement of the decarburized layer depth before the normalizing. The measurement results are listed in Tables 6 and 7. The results demonstrate that, in each electric resistance welded steel pipe or tube produced by a method satisfying the conditions according to the present disclosure, no noticeable decarburization occurred, and the depth of the total decarburized layer and the depth of the decarburized ferrite layer were successfully reduced.

(Quenching)

Figure 2:
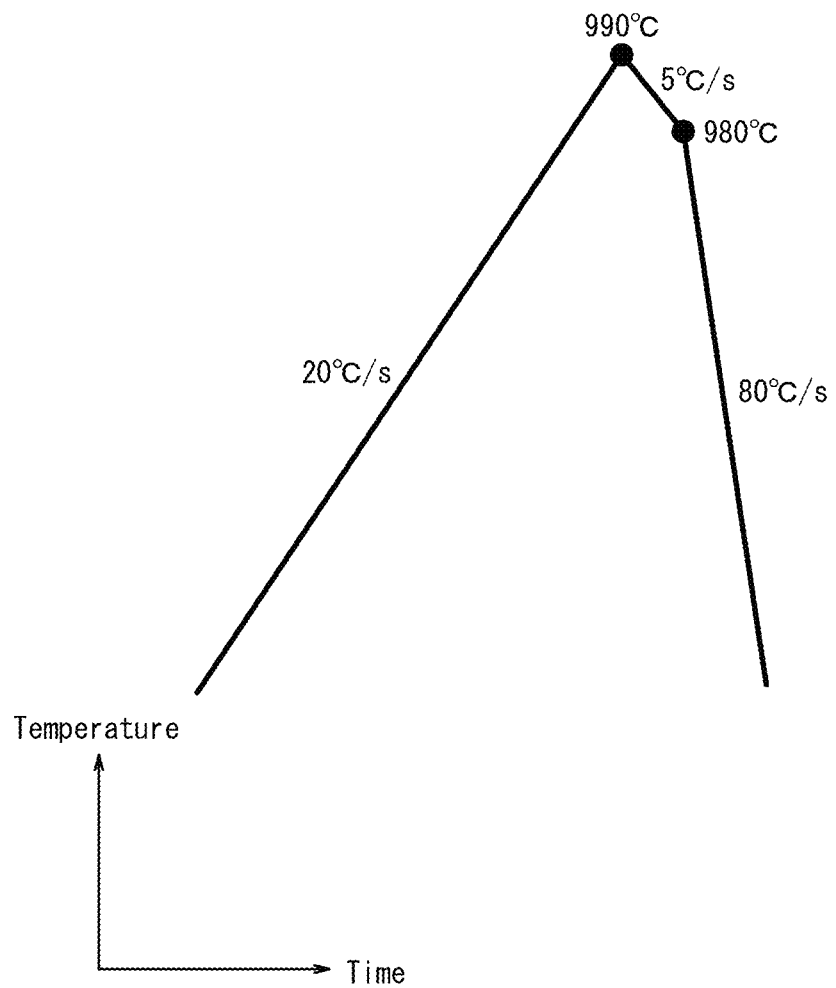
FIG. 2 is a graph schematically illustrating a heat pattern in quenching treatment in examples.

The electric resistance welded steel pipe or tube after the normalizing was then subjected to rapid and short-time heating quenching treatment in the heat pattern illustrated in FIG. 2. In detail, the following processes (1) to (3) were sequentially performed:

(1) heating from the room temperature to 990° C. at an average heating rate of 20° C./s (2) cooling (primary cooling) from 990° C. to 980° C. at an average cooling rate of 5° C./s (3) water cooling (secondary cooling) from 980° C. to the room temperature at an average cooling rate of 80° C./s.

(Hardness Test)

For each electric resistance welded steel pipe or tube after the quenching treatment, $Hv_O$ which is the Vickers hardness in the base metal portion and $Hv_1$ which is the Vickers hardness in the electric resistance weld portion were measured. The measurement results are listed in Tables 6 and 7. The measurement method is as follows.

A test piece for hardness measurement was collected from the obtained electric resistance welded steel pipe or tube, and the Vickers hardness (HV0.5) of each of the electric resistance weld portion and the base metal portion was measured in the sheet thickness direction by a Vickers hardness meter (load: 4.9 N). The measurement was performed at a 0.2 mm pitch in a range of 1 mm from each of the outer surface and the inner surface, and an arithmetic mean of the obtained values was taken to be the hardness in each of the electric resistance weld portion and the base metal portion of the steel pipe or tube.

(Tempering)

The electric resistance welded steel pipe or tube after the quenching was further subjected to tempering for 20 min at the tempering temperature listed in Tables 6 and 7. For the electric resistance welded steel pipe or tube after the tempering, too, $Hv_O$ which is the Vickers hardness in the base metal portion and $Hv_1$ which is the Vickers hardness in the electric resistance weld portion were measured by the same method as for the electric resistance welded steel pipe or tube after the quenching. The measurement results are listed in Tables 6 and 7.

(Torsional Fatigue Test)

A test material for a fatigue test (pipe or tube axial length: 250 mm) was collected from the electric resistance welded steel pipe or tube after the tempering, and subjected to a completely reversed torsional fatigue test in accordance with JIS Z 2273. In the torsional fatigue test, stress τ was 380 MPa for each steel pipe or tube using any of the steel sheets ID A, B, E, F, G, I, and J, and 470 MPa for each steel pipe or tube using any of the steel sheets ID C, D, and H. After the torsional fatigue test, the fracture state was observed. The case where abnormal cracking along the electric resistance weld portion occurred was evaluated as poor, and the case where other cracking occurred was evaluated as good. The evaluation results and the number of repetitions Nf until fracture are listed in Tables 6 and 7.

Figure 3:
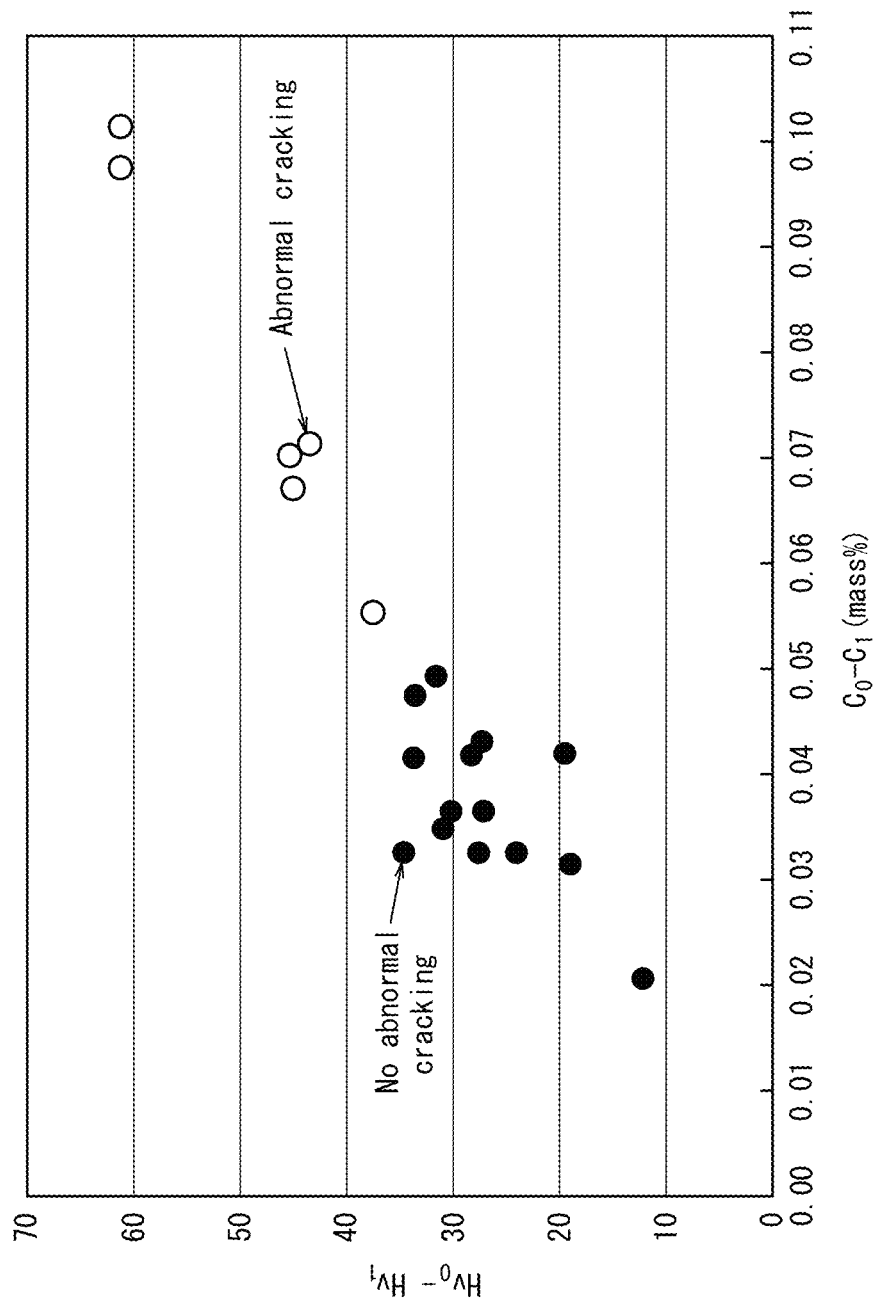
FIG. 3 is a graph illustrating the correlation between $C_0 - C_1$ and the difference in Vickers hardness between a base metal portion and an electric resistance weld portion after tempering and whether abnormal cracking occurred, where $C_0 - C_1$ is the difference between Ci (mass %) which is the minimum C content of the electric resistance weld portion and $C_0$ (mass %) which is the C content of the steel sheet.

FIG. 3 is a graph illustrating the relationship between $C_0$-$C_1$ and $Hv_0$-$Hv_1$, where $C_0$-$C_1$ is the difference between $C_1$ (mass %) which is the minimum C content of the electric resistance weld portion and $C_O$ (mass %) which is the C content of the steel sheet, and $Hv_0$-$Hv_1$ is the difference between $Hv_1$ which is the Vickers hardness of the electric resistance weld portion and $Hv_O$ which is the Vickers hardness of the base metal portion after the tempering. In the plot in FIG. 3, each white dot indicates the case where abnormal cracking along the electric resistance weld portion occurred in the torsional fatigue test, and each black dot indicates the case where no abnormal cracking along the electric resistance weld portion occurred in the torsional fatigue test.

As can be understood from FIG. 3 and the results in Tables 6 and 7, in the electric resistance welded steel pipes or tubes of Examples satisfying the conditions according to the present disclosure, there was no noticeable decrease of hardness in the electric resistance weld portion after the rapid and short-time heating quenching treatment, and no abnormal cracking along the electric resistance weld portion was seen in the torsional fatigue test. In the electric resistance welded steel pipes or tubes of Comparative Examples Nos. 3, 5 to 9, 21, and 22 not satisfying the conditions according to the present disclosure, there was a noticeable decrease of the hardness of the electric resistance weld portion after the rapid and short-time heating quenching treatment, and abnormal cracking along the electric resistance weld portion was seen in the torsional fatigue test. In Comparative Example No. 15 in which the relationship between Ti and N is outside the range according to the present disclosure, the quenching hardness in each of the base metal portion and the weld was lower than that of Example No. 1 having the same C content.

Figure 4:
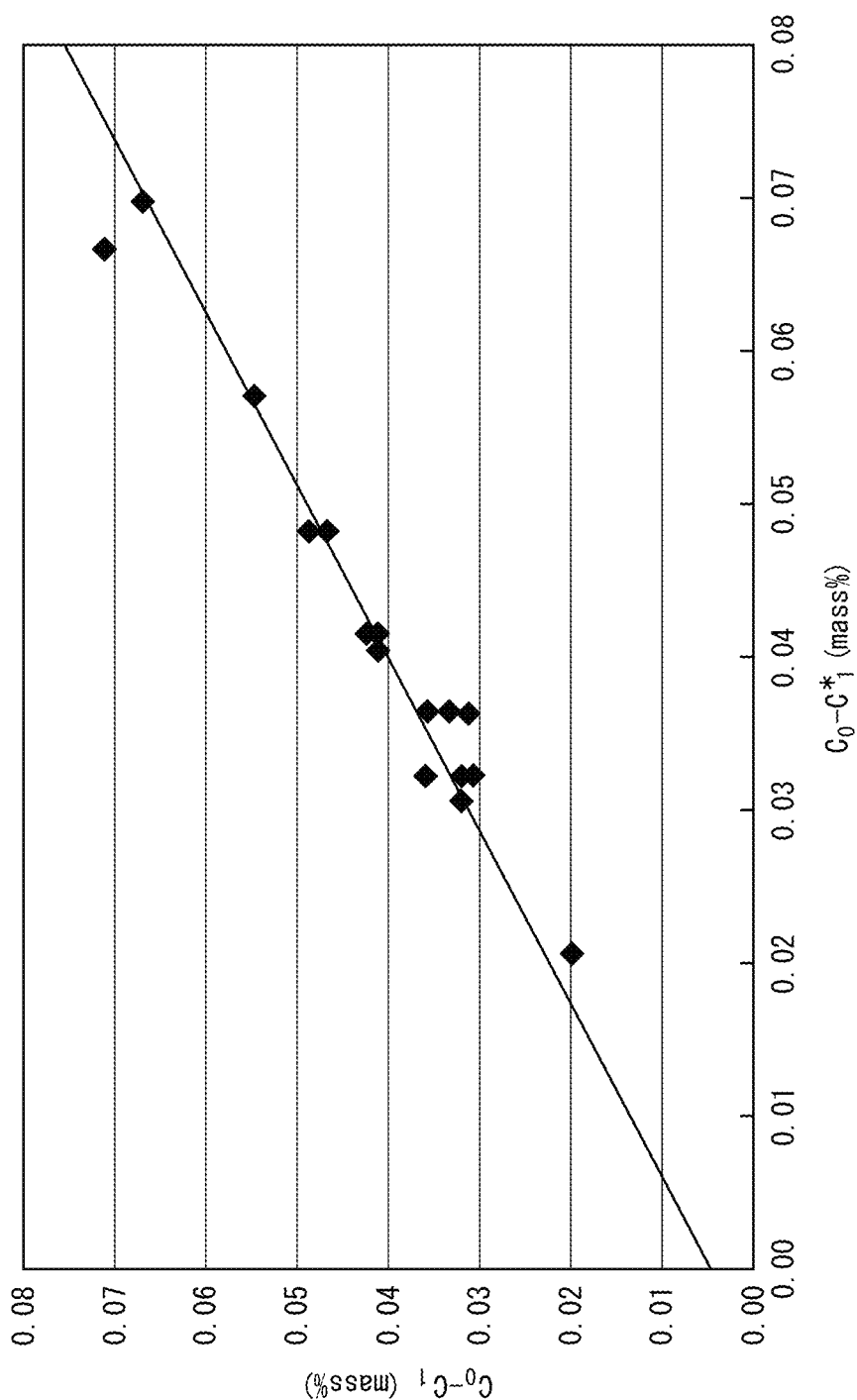
FIG. 4 is a graph illustrating the correlation between $C_0 - C^*_1$ and $C_0 - C_1$ which is a measured value, where $C_0 - C^*_1$ is the difference between $C^*_1$ (mass %) which is a calculated value of the minimum C content of the electric resistance weld portion according to Formula (2) and $C_0$ (mass %) which is the C content of the steel sheet.

FIG. 4 is a graph in which the horizontal axis represents $C_0-C^*_1$ and the vertical axis represents $C_0-C_1$, where $C_0-C^*_1$ is the difference between $C^*_1$ (mass %) which is the calculated value of the minimum C content of the electric resistance weld portion according to Formula (2) and $C_O$ (mass %) which is the C content of the steel sheet, and $C_0-C_1$ is the measured value. As can be understood from FIG. 4, in the case where normalizing is performed in the atmosphere defined in the present disclosure, $C^*_1$ which is the minimum C content of the electric resistance weld portion calculated using Formula (2) closely matches $C_1$ which is the measured minimum C content of the electric resistance weld portion.

TABLE 1

| Steel sheet ID | Chemical composition (mass %) *1 | | | | | | | | | | |
|---|---|---|---|---|---|---|---|---|---|---|---|
| | C | Si | Mn | P | S | Al | N | Ti | B | Cr | Mo |
| A | 0.24 | 0.19 | 0.55 | 0.015 | 0.0020 | 0.026 | 0.0032 | 0.015 | 0.0023 | 0.28 | — |
| B | 0.19 | 0.40 | 1.55 | 0.013 | 0.0020 | 0.033 | 0.0034 | 0.013 | 0.0013 | — | — |
| C | 0.26 | 0.17 | 1.24 | 0.011 | 0.0050 | 0.039 | 0.0046 | 0.036 | 0.0020 | 0.14 | — |
| D | 0.34 | 0.20 | 1.25 | 0.015 | 0.0019 | 0.029 | 0.0035 | 0.032 | 0.0021 | 0.12 | — |
| E | 0.24 | 0.22 | 0.53 | 0.012 | 0.0020 | 0.015 | 0.0048 | 0.009 | 0.0013 | 0.29 | — |
| F | 0.24 | 0.19 | 0.53 | 0.012 | 0.0020 | 0.020 | 0.0048 | 0.022 | 0.0013 | — | — |
| G | 0.24 | 0.08 | 0.55 | 0.009 | 0.0020 | 0.085 | 0.0077 | 0.039 | 0.0015 | 0.27 | — |
| H | 0.37 | 0.08 | 0.60 | 0.014 | 0.0020 | 0.050 | 0.0033 | 0.029 | 0.0019 | — | 0.15 |
| I | 0.24 | 0.25 | 1.43 | 0.011 | 0.0040 | 0.080 | 0.0050 | 0.028 | 0.0014 | — | — |
| J | 0.22 | 0.21 | 1.78 | 0.012 | 0.0022 | 0.028 | 0.0085 | 0.030 | 0.0015 | 0.15 | — |

| Steel sheet ID | Chemical composition (mass %) *1 | | | | | | Formula (1) | $Ac_3$ transformation point *2 (° C.) | Remarks |
|---|---|---|---|---|---|---|---|---|---|
| | W | Ni | Cu | Nb | V | Ca | O | | | |
| A | — | — | — | — | — | 0.0020 | 0.0021 | Conforming | 826 | Conforming steel sheet |
| B | — | — | 0.12 | 0.014 | — | 0.0002 | 0.0013 | Conforming | 820 | Conforming steel sheet |
| C | — | — | — | — | — | 0.0015 | 0.0010 | Conforming | 813 | Conforming steel sheet |
| D | — | — | — | — | — | 0.0012 | 0.0021 | Conforming | 797 | Conforming steel sheet |
| E | — | — | — | — | — | 0.0002 | 0.0014 | Non-conforming | 819 | Comparative steel sheet |
| F | — | — | — | — | — | — | 0.0014 | Conforming | 828 | Conforming steel sheet |
| G | — | — | — | — | — | 0.0019 | 0.0014 | Conforming | 854 | Conforming steel sheet |
| H | — | — | — | 0.016 | — | — | — | Conforming | 813 | Conforming steel sheet |
| I | 0.15 | 0.21 | — | — | — | — | 0.0012 | Conforming | 830 | Conforming steel sheet |
| J | — | — | 0.15 | — | 0.08 | — | 0.0011 | Conforming | 802 | Conforming steel sheet |

*1 the balance consisting of Fe and inevitable impuries
*2 calculated value according to Formula (5)

TABLE 2

| No. | Steel sheet ID | Bond width (μm) | Depth of decarburized layer (before normalizing) | | | | Normalizing conditions | | Calculated value *1 | |
|---|---|---|---|---|---|---|---|---|---|---|
| | | | Total decarburized layer | | Decarburized ferrite layer | | Heat pattern | | | |
| | | | Outer surface (μm) | Inner surface (μm) | Outer surface (μm) | Inner surface (μm) | T (° C.) | t (sec) | $C^*_1$ (mass %) | $C_0-C^*_1$ (mass %) |
| 1 | A | 60 | 12 | 12 | 0 | 0 | 920 | 627 | 0.204 | 0.036 |
| 2 | A | 80 | 12 | 12 | 0 | 0 | 920 | 617 | 0.192 | 0.048 |

TABLE 2-continued

| | | | Depth of decarburized layer (before normalizing) | | | | Normalizing conditions | | | |
|---|---|---|---|---|---|---|---|---|---|---|
| | | | Total decarburized layer | | Decarburized ferrite layer | | Heat pattern | | Calculated value *1 | |
| No. | Steel sheet ID | Bond width (μm) | Outer surface (μm) | Inner surface (μm) | Outer surface (μm) | Inner surface (μm) | T (° C.) | t (sec) | $C^*_1$ (mass %) | $C_0-C^*_1$ (mass %) |
| 3 | A | 120 | 12 | 12 | 0 | 0 | 920 | 617 | 0.170 | <u>0.070</u> |
| 4 | A | 60 | 12 | 12 | 0 | 0 | 900 | 617 | 0.199 | 0.041 |
| 5 | A | 85 | 12 | 12 | 0 | 0 | 900 | 627 | 0.183 | <u>0.057</u> |
| 6 | A | 100 | 12 | 12 | 0 | 0 | 900 | 617 | 0.173 | <u>0.067</u> |
| 7 | A | 80 | 12 | 12 | 0 | 0 | 920 | 617 | 0.192 | 0.048 |
| 8 | A | 80 | 12 | 12 | 0 | 0 | 920 | 617 | 0.192 | 0.048 |
| 9 | A | 80 | 12 | 12 | 0 | 0 | 920 | 617 | 0.192 | 0.048 |
| 10 | B | 80 | 12 | 12 | 0 | 0 | 920 | 617 | 0.158 | 0.032 |
| 11 | C | 80 | 12 | 12 | 0 | 0 | 940 | 617 | 0.212 | 0.048 |
| 12 | D | 50 | 12 | 12 | 0 | 0 | 920 | 1217 | 0.304 | 0.036 |
| 13 | D | 50 | 12 | 12 | 0 | 0 | 940 | 1217 | 0.308 | 0.032 |
| 14 | D | 50 | 12 | 12 | 0 | 0 | 925 | 917 | 0.299 | 0.041 |
| 15 | <u>E</u> | 60 | 12 | 12 | 0 | 0 | 900 | 617 | 0.199 | 0.041 |
| 16 | <u>F</u> | 60 | 12 | 12 | 0 | 0 | 900 | 617 | 0.199 | 0.041 |
| 17 | H | 45 | 12 | 12 | 0 | 0 | 925 | 627 | 0.321 | 0.049 |
| 18 | I | 60 | 12 | 12 | 0 | 0 | 920 | 617 | 0.204 | 0.036 |
| 19 | J | 60 | 12 | 12 | 0 | 0 | 920 | 617 | 0.188 | 0.032 |

*1 $C^*_1$ was calculated according to Formula (2).

TABLE 3

| | | | Depth of decarburized layer (before normalizing) | | | | Normalizing conditions | | | |
|---|---|---|---|---|---|---|---|---|---|---|
| | | | Total decarburized layer | | Decarburized ferrite layer | | Heat pattern | | Calculated value *1 | |
| No. | Steel sheet ID | Bond width (μm) | Outer surface (μm) | Inner surface (μm) | Outer surface (μm) | Inner surface (μm) | T (° C.) | t (sec) | $C^*_1$ (mass %) | $C_0-C^*_1$ (mass %) |
| 20 | A | 60 | 12 | 12 | 0 | 0 | 920 | 617 | 0.204 | 0.036 |
| 21 | A | 60 | 12 | 12 | 0 | 0 | 920 | 617 | 0.204 | 0.036 |
| 22 | A | 60 | 12 | 12 | 0 | 0 | 920 | 617 | 0.204 | 0.036 |
| 23 | B | 50 | 12 | 12 | 0 | 0 | 920 | 617 | 0.170 | 0.020 |
| 24 | C | 50 | 12 | 12 | 0 | 0 | 940 | 617 | 0.230 | 0.030 |
| 25 | D | 50 | 12 | 12 | 0 | 0 | 940 | 1217 | 0.308 | 0.032 |
| 26 | F | 60 | 12 | 12 | 0 | 0 | 900 | 617 | 0.199 | 0.041 |
| 27 | A | 60 | 12 | 12 | 0 | 0 | 920 | 617 | 0.204 | 0.036 |
| 28 | G | 60 | 12 | 12 | 0 | 0 | 920 | 617 | 0.204 | 0.036 |
| 29 | H | 45 | 12 | 12 | 0 | 0 | 925 | 627 | 0.321 | 0.049 |
| 30 | I | 60 | 12 | 12 | 0 | 0 | 920 | 617 | 0.204 | 0.036 |
| 31 | J | 60 | 12 | 12 | 0 | 0 | 920 | 617 | 0.188 | 0.032 |

*1 $C^*_1$ was calculated according to Formula (2).

TABLE 4

| | Normalizing atmosphere | | | | | | | | | |
|---|---|---|---|---|---|---|---|---|---|---|
| | Partial pressure in atmosphere *1 | | | | Calculated value | | | | | |
| No. | CO ($10^{-2}$ atm) | $CO_2$ ($10^{-2}$ atm) | $H_2$ ($10^{-2}$ atm) | $H_2O$ ($10^{-2}$ atm) | K | K' | $a_c^\gamma$ | $(P_{CO})^2/P_{CO2}$ | $(P_{PH}P_{CO})/P_{H2O}$ | $(P_{CO})^2/P_{CO2} \geq Ka_c^\gamma$ | $(P_{PH}P_{CO})/P_{H2O} \geq K'a_c^\gamma$ |
| 1 | 8 | 0.1 | 5 | 0.02 | 51.74 | 18.49 | 0.11 | 6.40 | 20.00 | Good | Good |
| 2 | 8 | 0.1 | 5 | 0.02 | 51.74 | 18.49 | 0.11 | 6.40 | 20.00 | Good | Good |
| 3 | 8 | 0.1 | 5 | 0.02 | 51.74 | 18.49 | 0.11 | 6.40 | 20.00 | Good | Good |
| 4 | 8 | 0.1 | 5 | 0.02 | 38.72 | 14.75 | 0.12 | 6.40 | 20.00 | Good | Good |
| 5 | 8 | 0.1 | 5 | 0.02 | 38.72 | 14.75 | 0.12 | 6.40 | 20.00 | Good | Good |
| 6 | 8 | 0.1 | 5 | 0.02 | 38.72 | 14.75 | 0.12 | 6.40 | 20.00 | Good | Good |
| 7 | 8 | 7 | 10 | 2.5 | 51.74 | 18.49 | 0.11 | 0.09 | 0.32 | Poor | Poor |
| 8 | 8 | 0.1 | 5 | 0.6 | 51.74 | 18.49 | 0.11 | 6.40 | 0.67 | Good | Poor |
| 9 | 8 | 0.2 | 5 | 0.02 | 51.74 | 18.49 | 0.11 | 3.20 | 20.00 | Poor | Good |
| 10 | 8 | 0.1 | 5 | 0.02 | 51.74 | 18.49 | 0.09 | 6.40 | 20.00 | Good | Good |
| 11 | 8 | 0.05 | 5 | 0.02 | 68.47 | 23.00 | 0.12 | 12.80 | 20.00 | Good | Good |
| 12 | 20 | 0.3 | 16 | 1 | 51.74 | 18.49 | 0.17 | 13.33 | 3.20 | Good | Good |
| 13 | 8 | 0.05 | 5 | 0.02 | 68.47 | 23.00 | 0.16 | 12.80 | 20.00 | Good | Good |
| 14 | 20 | 0.3 | 16 | 0.6 | 55.55 | 19.54 | 0.16 | 13.33 | 5.33 | Good | Good |
| 15 | 8 | 0.1 | 5 | 0.02 | 38.72 | 14.75 | 0.12 | 6.40 | 20.00 | Good | Good |
| 16 | 8 | 0.1 | 5 | 0.02 | 38.72 | 14.75 | 0.12 | 6.40 | 20.00 | Good | Good |
| 17 | 8 | 0.05 | 5 | 0.02 | 55.55 | 19.54 | 0.18 | 12.80 | 39.80 | Good | Good |
| 18 | 8 | 0.1 | 5 | 0.02 | 51.74 | 18.49 | 0.11 | 6.40 | 39.80 | Good | Good |
| 19 | 8 | 0.1 | 5 | 0.02 | 51.74 | 18.49 | 0.10 | 6.40 | 39.80 | Good | Good |

*1 the balance consisting of nitrogen

TABLE 5

| | Normalizing atmosphere | | | |
|---|---|---|---|---|
| No. | $H_2$ mole fraction (%) | $O_2$ mole fraction (ppm) | Dew point (°C.) | Balance |
| 20 | 7 | 80 | −30 | Nitrogen |
| 21 | 7 | 100 | −30 | Nitrogen |
| 22 | 8 | 80 | 20 | Nitrogen |
| 23 | 5 | 60 | −40 | Nitrogen |
| 24 | 5 | 60 | −40 | Nitrogen |
| 25 | 1 | 60 | −40 | Nitrogen |
| 26 | 10 | 60 | 0 | Nitrogen |
| 27 | 0 | 20 | −25 | Nitrogen |
| 28 | 0 | 10 | −50 | Nitrogen |
| 29 | 0 | 5 | −50 | Nitrogen |
| 30 | 3 | 80 | −25 | Nitrogen |
| 31 | 0.01 | 80 | −30 | Nitrogen |

TABLE 6

| | Electric resistance welded steel pipe or tube after normalizing and before quenching | | | | | After quenching and before tempering | |
|---|---|---|---|---|---|---|---|
| | | Depth of decarburized layer | | | | Hardness | |
| | | Total decarburized layer | | Decarburized ferrite layer | | Electric resistance weld portion $Hv_1$ | Base metal portion $Hv_2$ |
| No. | $C_0-C_1$ (mass %) | Outer surface (μm) | Inner surface (μm) | Outer surface (μm) | Inner surface (μm) | | |
| 1 | 0.032 | 15 | 15 | 0 | 0 | 442 | 470 |
| 2 | 0.049 | 14 | 14 | 0 | 0 | 434 | 470 |
| 3 | 0.067 | 15 | 16 | 0 | 0 | 419 | 470 |
| 4 | 0.042 | 16 | 15 | 0 | 0 | 439 | 470 |
| 5 | 0.055 | 15 | 16 | 0 | 0 | 428 | 470 |
| 6 | 0.071 | 16 | 14 | 0 | 0 | 421 | 470 |
| 7 | 0.101 | 150 | 100 | 150 | 100 | 401 | 470 |
| 8 | 0.097 | 55 | 60 | 50 | 55 | 401 | 470 |
| 9 | 0.098 | 60 | 60 | 55 | 55 | 401 | 470 |
| 10 | 0.031 | 15 | 15 | 0 | 0 | 411 | 433 |
| 11 | 0.047 | 12 | 12 | 0 | 0 | 448 | 486 |
| 12 | 0.036 | 16 | 15 | 0 | 0 | 523 | 557 |
| 13 | 0.036 | 15 | 15 | 0 | 0 | 527 | 557 |

TABLE 6-continued

| No. | | | | | | | |
|---|---|---|---|---|---|---|---|
| 14 | 0.041 | 15 | 15 | 0 | 0 | 520 | 557 |
| 15 | 0.041 | 15 | 14 | 0 | 0 | 351 | 376 |
| 16 | 0.041 | 12 | 12 | 0 | 0 | 430 | 470 |
| 17 | 0.049 | 12 | 12 | 0 | 0 | 539 | 587 |
| 18 | 0.035 | 12 | 10 | 0 | 0 | 442 | 470 |
| 19 | 0.033 | 12 | 12 | 0 | 0 | 431 | 454 |

| | Tempering | After tempering | | Result of torsional fatigue test | | |
|---|---|---|---|---|---|---|
| | | Hardness | | | | |
| No. | Tempering temperature (° C.) | Electric resistance weld portion $Hv_1$ | Base metal portion $Hv_2$ | Cracking | Nf (10,000 times) | Remarks |
| 1  | 350 | 385 | 410 | Good | 6  | Example |
| 2  | 350 | 378 | 410 | Good | 6  | Example |
| 3  | 350 | 365 | 410 | Poor | 1  | Comparative Example |
| 4  | 350 | 382 | 410 | Good | 6  | Example |
| 5  | 350 | 372 | 410 | Poor | 1  | Comparative Example |
| 6  | 350 | 366 | 410 | Poor | 1  | Comparative Example |
| 7  | 350 | 348 | 410 | Poor | 1  | Comparative Example |
| 8  | 350 | 348 | 410 | Poor | 1  | Comparative Example |
| 9  | 350 | 348 | 410 | Poor | 1  | Comparative Example |
| 10 | 300 | 387 | 406 | Good | 5  | Example |
| 11 | 250 | 417 | 450 | Good | 15 | Example |
| 12 | 250 | 468 | 498 | Good | 15 | Example |
| 13 | 250 | 471 | 498 | Good | 15 | Example |
| 14 | 250 | 464 | 498 | Good | 15 | Example |
| 15 | 350 | 356 | 379 | Good | 1  | Comparative Example |
| 16 | 350 | 390 | 410 | Good | 6  | Example |
| 17 | 250 | 484 | 518 | Good | 15 | Example |
| 18 | 350 | 388 | 410 | Good | 6  | Example |
| 19 | 350 | 387 | 405 | Good | 6  | Example |

TABLE 7

| | Electric resistance welded steel pipe or tube after normalizing and before quenching | | | | | After quenching and before tempering | |
|---|---|---|---|---|---|---|---|
| | | Depth of decarburized layer | | | | Hardness | |
| | | Total decarburized layer | | Decarburized ferrite layer | | | |
| No. | $C_0-C_1$ (mass %) | Outer surface (μm) | Inner surface (μm) | Outer surface (μm) | Inner surface (μm) | Electric resistance weld portion $Hv_1$ | Base metal portion $Hv_2$ |
| 20 | 0.034 | 12 | 12 | 0  | 0  | 434 | 470 |
| 21 | 0.070 | 55 | 55 | 10 | 10 | 419 | 470 |
| 22 | 0.070 | 55 | 55 | 20 | 10 | 419 | 470 |
| 23 | 0.020 | 14 | 15 | 0  | 0  | 419 | 433 |
| 24 | 0.032 | 15 | 15 | 0  | 0  | 455 | 486 |
| 25 | 0.032 | 12 | 12 | 0  | 0  | 519 | 557 |
| 26 | 0.041 | 14 | 14 | 0  | 0  | 439 | 470 |
| 27 | 0.034 | 10 | 10 | 0  | 0  | 440 | 470 |
| 28 | 0.032 | 10 | 10 | 0  | 0  | 440 | 470 |
| 29 | 0.048 | 10 | 10 | 0  | 0  | 540 | 580 |
| 30 | 0.035 | 12 | 10 | 0  | 0  | 440 | 475 |
| 31 | 0.035 | 10 | 10 | 0  | 0  | 435 | 450 |

TABLE 7-continued

| | After tempering | | | | |
|---|---|---|---|---|---|
| | | Hardness | | Result of torsional fatigue test | |
| | Tempering | Electric resistance weld portion $Hv_1$ | Base metal portion $Hv_2$ | | |
| No. | Tempering temperature (° C.) | | | Cracking | Nf (10,000 times) | Remarks |
| 20 | 350 | 378 | 410 | Good | 6 | Example |
| 21 | 350 | 364 | 410 | Poor | 1 | Comparative Example |
| 22 | 350 | 364 | 410 | Poor | 1 | Comparative Example |
| 23 | 300 | 394 | 406 | Good | 5 | Example |
| 24 | 250 | 422 | 450 | Good | 15 | Example |
| 25 | 250 | 463 | 498 | Good | 15 | Example |
| 26 | 350 | 382 | 410 | Good | 6 | Example |
| 27 | 350 | 390 | 410 | Good | 6 | Example |
| 28 | 350 | 393 | 415 | Good | 6 | Example |
| 29 | 250 | 490 | 522 | Good | 15 | Example |
| 30 | 350 | 390 | 410 | Good | 6 | Example |
| 31 | 350 | 392 | 406 | Good | 6 | Example |

The invention claimed is:

1. A method of producing an electric resistance welded steel pipe or tube, the method comprising:

electric resistance welding a steel sheet to form an electric resistance welded steel pipe or tube that includes an electric resistance weld portion having a bond width of $40 \times 10^{-6}$ m or more and $120 \times 10^{-6}$ m or less and in which a depth of a total decarburized layer in each of an inner surface layer and an outer surface layer is $50 \times 10^{-6}$ m or less, the steel sheet having a chemical composition containing, in mass %, C: 0.15% to 0.40%,
Si: 0.05% to 0.50%,
Mn: 0.30% to 2.00%,
Al: 0.01% to 0.10%,
Ti: 0.001% to 0.04%,
B: 0.0005% to 0.0050%, and
N: 0.0010% to 0.0100%, with a balance consisting of Fe and inevitable impurities, a Ti content and a N content satisfying the following Formula (1)

$$(N/14) < (Ti/47.9) \qquad (1)$$

where N is the N content in mass % and Ti is the Ti content in mass %; and thereafter normalizing the electric resistance welded steel pipe or tube under conditions that $C_0 - C^*_1$ is 0.05 mass % or less where $C_0 - C^*_1$ is a difference between $C^*_1$ and $C_0$, $C^*_1$ in mass % is a calculated value of a minimum C content of the electric resistance weld portion according to the following Formula (2)

$$C^*_1 = C_0 - (C_0 - 0.09)\mathrm{erf}(h') \qquad (2)$$

where
$C_O$ is the C content in mass % of the steel sheet,
$h' = h/(Dt)^{1/2}$,
h is the bond width divided by 2 and in units of meters,
D in units of $m^2/s = D_O \exp(-Q/RT)$,
$D_0 = 4.7 \times 10^{-5}$ $m^2/s$,
Q=155 kJ/mol·K,
R=8.31 J/mol·K,
T is a maximum heating temperature in Kelvin in the normalizing, and
t is a time in units of seconds during which the electric resistance welded steel pipe or tube is held in a temperature range of (T-50 K) to T in the normalizing, and
$C_O$ in mass % is a C content of the steel sheet, in an atmosphere that is composed of $C_0$, $CO_2$, $H_2$, $H_2O$, and a gas neutral to C and Fe and satisfies the following Formulas (3) and (4), $$(P_{CO})^2/P_{CO2} \geq K \cdot a_C^\gamma \qquad (3)$$

$$P_{H2} \cdot P_{CO}/P_{H2O} \geq K' \cdot a_C^\gamma \qquad (4)$$

where
$\log(K) = -9460/T - 1.26 \log(T) + 13.52$,
$K' = \exp[-(131300 - 134.3T)/RT]$,
$a_C^\gamma = x_C^\gamma \cdot \exp[(G_C^\gamma + \Omega_{FeC}^\gamma - G_C^{gr}) \cdot RT] \cdot \exp[(-2\Omega_{FeC}^\gamma \cdot x_C^\gamma \cdot x_M^\gamma)/RT]$,
$G_C^\gamma - G_C^{gr} = 73744$ J/mol,
$2\Omega_{FeC}^\gamma = -51956$ J/mol,
$W_{MnC}^\gamma = +41900$ J/mol,
$W_{SiC}^\gamma = +125700$ J/mol,
$W_{CrC}^\gamma = -104750$ J/mol,
$P_{CO}$ is a partial pressure in units of atm of CO in a furnace atmosphere,
$P_{CO2}$ is a partial pressure in units of atm of $CO_2$ in the furnace atmosphere,
$P_{H2}$ is a partial pressure in units of atm of $H_2$ in the furnace atmosphere,
$P_{H2O}$ is a partial pressure in units of atm of $H_2O$ in the furnace atmosphere,
R=8.31 J/mol·K,
T is the maximum heating temperature in Kelvin in the normalizing,
$a_C^\gamma$ is an activity of C in austenite phase,
$x_C^\gamma$ is a mole fraction of C in the austenite phase,
$x_{Si}^\gamma$ is a mole fraction of Si in the austenite phase,
$x_{Mn}^\gamma$ is a mole fraction of Mn in the austenite phase,
$x_{Cr}^\pm$ is a mole fraction of Cr in the austenite phase,
$G_C^\gamma$ is a free energy of C in the austenite phase, and
$G_C^{gr}$ is a free energy of C in graphite.

2. The method of producing an electric resistance welded steel pipe or tube according to claim 1, wherein the chemical composition further contains, in mass %, one or more selected from the group consisting of
Cr: 1.0% or less,
Mo: 1.0% or less,
W: 1.0% or less, Ni: 1.0% or less,
Cu: 1.0% or less,
Nb: 0.2% or less,
V: 0.2% or less, and
Ca: 0.0050% or less.

3. A method of producing an electric resistance welded steel pipe or tube, the method comprising:

electric resistance welding a steel sheet to form an electric resistance welded steel pipe or tube that includes an electric resistance weld portion having a bond width of $40 \times 10^{-6}$ m or more and $120 \times 10^{-6}$ m or less and in which a depth of a total decarburized layer in each of an inner surface layer and an outer surface layer is $50 \times 10^{-6}$ m or less, the steel sheet having a chemical composition containing, in mass %, C: 0.15% to 0.40%,
Si: 0.05% to 0.50%,
Mn: 0.30% to 2.00%,
Al: 0.01% to 0.10%,
Ti: 0.001% to 0.04%,
B: 0.0005% to 0.0050%, and
N: 0.0010% to 0.0100%, with a balance consisting of Fe and inevitable impurities, a Ti content and a N content satisfying the following Formula (1)

$$(N/14) < (Ti/47.9) \quad (1)$$

where N is the N content in mass % and Ti is the Ti content in mass %; and thereafter normalizing the electric resistance welded steel pipe or tube under conditions that $C_0 - C^*_1$ is 0.05 mass % or less where $C_0 - C^*_1$ is a difference between $C^*_1$ and $C_0$, $C^*_1$ in mass % is a calculated value of a minimum C content of the electric resistance weld portion according to the following Formula (2)

$$C^*_1 = C_0 - (C_0 - 0.09) \mathrm{erf}(h') \quad (2)$$

where $C_O$ is the C content in mass % of the steel sheet, $h' = h/(Dt)^{1/2}$, h is the bond width divided by 2 and in units of meters, D in units of $m^2/s = D_0 \exp(-Q/RT)$, $D_0 = 4.7 \times 10^{-5}$ m²/s, Q=155 kJ/mol·K, R=8.31 J/mol·K, T is a maximum heating temperature in Kelvin in the normalizing, and t is a time in units of seconds during which the electric resistance welded steel pipe or tube is held in a temperature range of (T-50 K) to T in the normalizing, and $C_O$ in mass % is a C content of the steel sheet, in an atmosphere that is composed of, in mole fraction in a furnace atmosphere, $H_2$: 0% to 10% and $O_2$: 80 ppm or less with a balance consisting of $H_2O$ and $N_2$ and has a dew point of 0° C. or less.

4. The method of producing an electric resistance welded steel pipe or tube according to claim 3, wherein the chemical composition further contains, in mass %, one or more selected from the group consisting of Cr: 1.0% or less,
Mo: 1.0% or less,
W: 1.0% or less,
Ni: 1.0% or less,
Cu: 1.0% or less,
Nb: 0.2% or less,
V: 0.2% or less, and
Ca: 0.0050% or less.

* * * * *